United States Patent
Stoehr et al.

(10) Patent No.: US 11,581,564 B2
(45) Date of Patent: Feb. 14, 2023

(54) ELECTROCHEMICAL SYSTEM

(71) Applicant: Reinz-Dichtungs-GmbH, Neu-Ulm (DE)

(72) Inventors: Thomas Stoehr, Laupheim (DE); Andre Speidel, Bussmannshausen (DE); Rainer Glueck, Dornstadt (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 0 days.

(21) Appl. No.: 16/955,731

(22) PCT Filed: Dec. 19, 2018

(86) PCT No.: PCT/EP2018/085893
§ 371 (c)(1),
(2) Date: Jun. 18, 2020

(87) PCT Pub. No.: WO2019/121947
PCT Pub. Date: Jun. 27, 2019

(65) Prior Publication Data
US 2021/0075050 A1   Mar. 11, 2021

(30) Foreign Application Priority Data

Dec. 20, 2017 (DE) .................... 20 2017 107 797.7

(51) Int. Cl.
*H01M 8/2465* (2016.01)
*H01M 8/0247* (2016.01)
*H01M 8/2404* (2016.01)

(52) U.S. Cl.
CPC ....... *H01M 8/2465* (2013.01); *H01M 8/0247* (2013.01); *H01M 8/2404* (2016.02)

(58) Field of Classification Search
CPC ............. H01M 8/0206; H01M 8/0247; H01M 8/0297; H01M 8/2404; H01M 8/2465
See application file for complete search history.

(56) References Cited

U.S. PATENT DOCUMENTS

| 9,590,263 B2 | 3/2017 | Martinchek et al. |
| 2009/0029217 A1 | 1/2009 | Kawabata et al. |
| (Continued) | | |

FOREIGN PATENT DOCUMENTS

| DE | 10351921 A1 | 10/2004 |
| DE | 102017200198 A1 | 7/2018 |
| (Continued) | | |

OTHER PUBLICATIONS

ISA European Patent Office, International Search Report Issued in Application No. PCT/EP2018/085893, dated Feb. 13, 2019, WIPO, 3 pages.

(Continued)

*Primary Examiner* — Stewart A Fraser
*Assistant Examiner* — Brent C Thomas
(74) *Attorney, Agent, or Firm* — McCoy Russell LLP

(57) ABSTRACT

An electrochemical system having two metallic separator plates, an electrochemical cell arranged between the separator plates and sealed by at least one sealing element, and fixing elements for fixing the separator plates. The fixing elements comprise at least two fixing elements which are designed as integral with the first or with the second separator plate, which differ from the at least one sealing element, are spaced apart from the at least one sealing element parallel to the plate planes of the separator plates, and project at least in sections beyond the plate planes of the separator plates in a stacking direction. The first fixing element is thereby supported on the second fixing element in such a way that the second fixing element prevents a displacement of the first separator plate relative to the second separator plate.

20 Claims, 13 Drawing Sheets

(56) References Cited

U.S. PATENT DOCUMENTS

| | | | |
|---|---|---|---|
| 2009/0169964 A1* | 7/2009 | Ikeda | H01M 8/0254 |
| | | | 429/509 |
| 2009/0239128 A1* | 9/2009 | Keyser | H01M 8/0258 |
| | | | 429/432 |
| 2016/0072145 A1* | 3/2016 | Martinchek | H01M 8/2404 |
| | | | 429/457 |
| 2018/0175403 A1* | 6/2018 | Lim | H01M 8/0267 |

FOREIGN PATENT DOCUMENTS

| | | |
|---|---|---|
| JP | 2008078050 A | 4/2008 |
| JP | 2008269936 A | 11/2008 |

OTHER PUBLICATIONS

Japanese Patent Office, Office Action Issued in Application No. 2020-534490, dated Dec. 6, 2022, 7 pages.

* cited by examiner

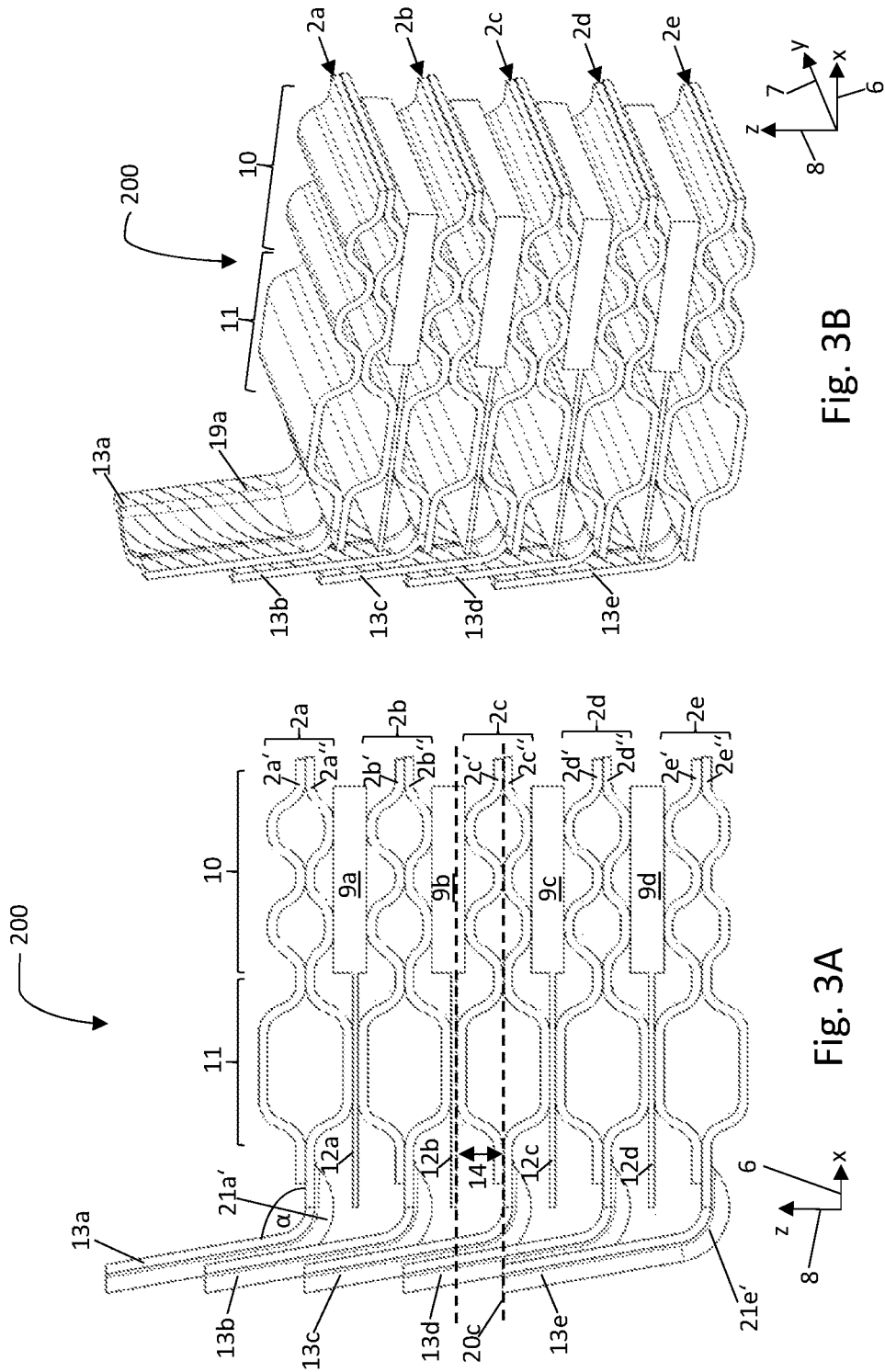

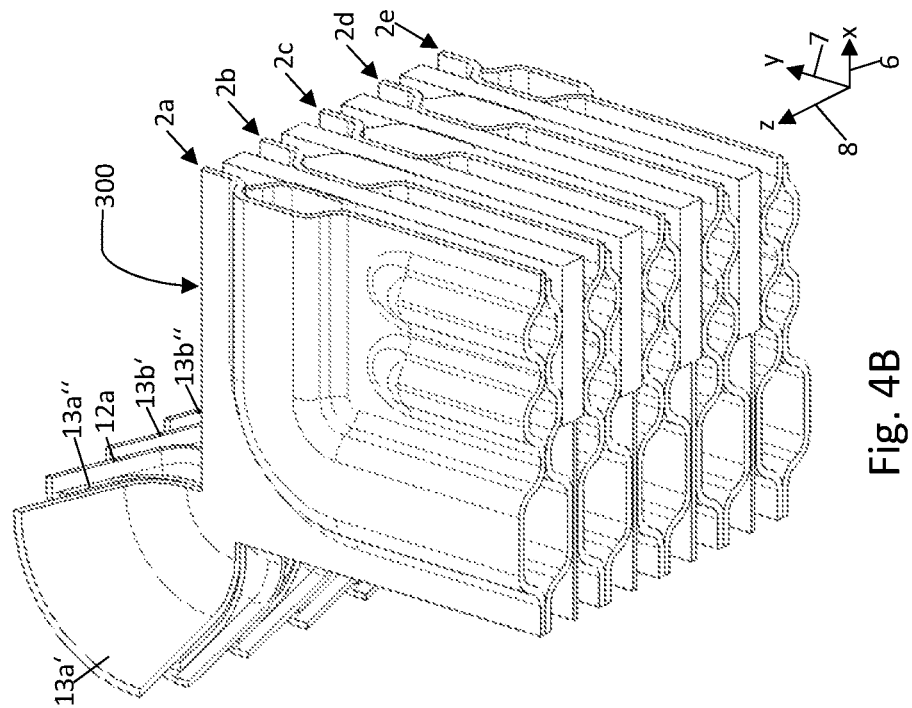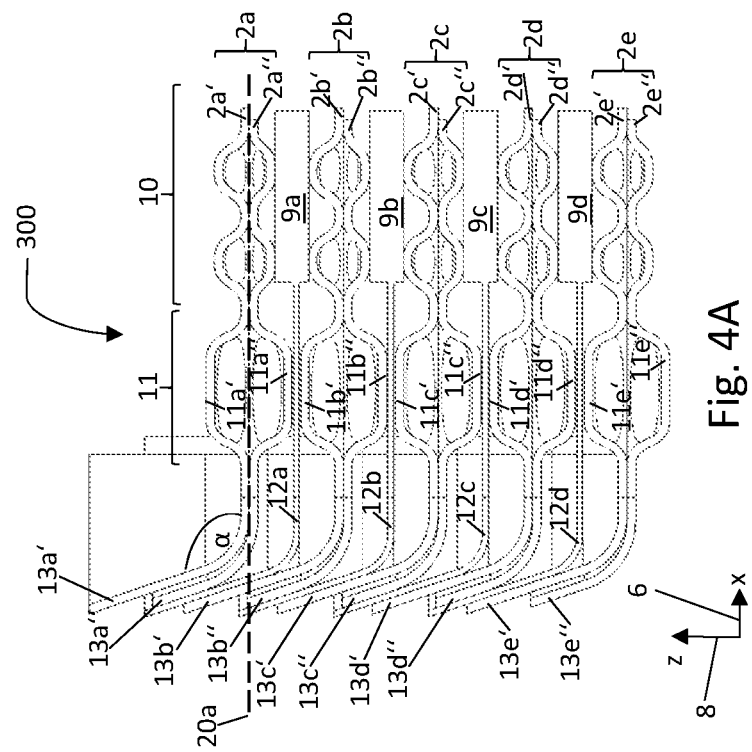
Fig. 4A
Fig. 4B

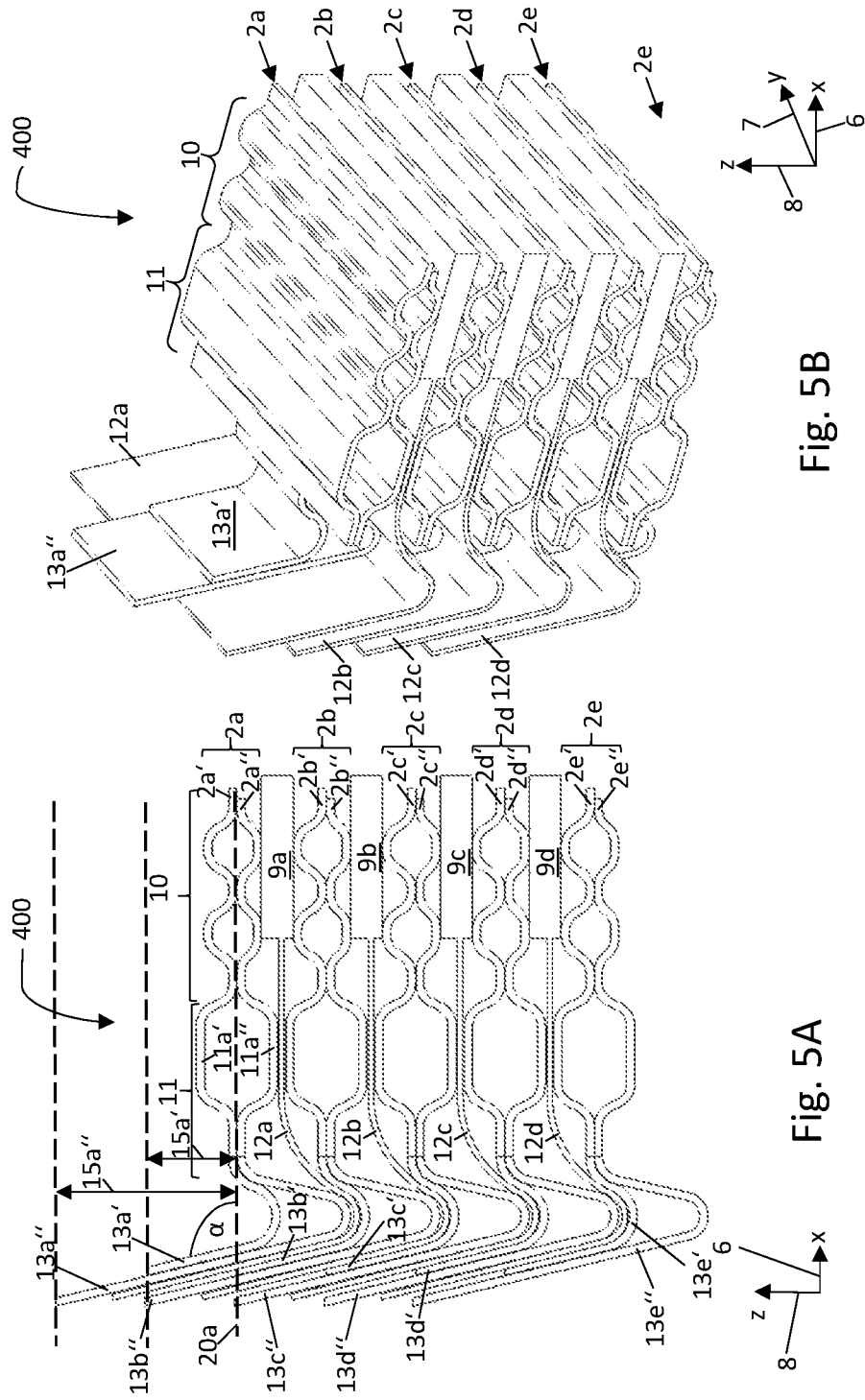

ELECTROCHEMICAL SYSTEM

CROSS-REFERENCE TO RELATED APPLICATIONS

The present application is a U.S. National Phase of International Patent Application Serial No. PCT/EP2018/085893, entitled "Elektrochemisches System", and filed on Dec. 19, 2018. International Patent Application Serial No. PCT/EP2018/085893 claims priority to German Utility Model Application No. 20 2017 107 797.7, filed on Dec. 20, 2017. The entire contents of each of the above-mentioned applications are hereby incorporated by reference in their entirety for all purposes.

TECHNICAL FIELD

The invention relates to an electrochemical system having at least two separator plates and an electrochemical cell arranged between the separator plates.

BACKGROUND AND SUMMARY

Known electrochemical systems normally comprise a stack of electrochemical cells which are each separated from one another by separator plates. The term electrochemical cell within the framework of this document in particular is to include cells for converting chemical energy into electrical energy (e.g. fuel cells), for inducing a chemical reaction by way of feeding electrical energy (i.e. electrolysis cells) or for the exchange of moisture between gases (i.e. humidifier cells).

Typically, the separator plates are formed from two joined-together individual plates. The individual plates of the separator plate can be materially joined together, e.g. by way of one or more weld connections, in particular by way of one or more laser weld connections. Furthermore, the separator plates usually comprise at least one or more through-openings. The media and/or the reaction products can be led to the electrochemical cells which are arranged between adjacent separator plates of the stack or into the interior which is formed by the individual plates of the separator plate or be led away from the cells or out of the interior, through the through-openings.

Said separator plates may function, e.g., for electrical contacting of the electrodes of the individual electrochemical cells (e.g., fuel cells) and/or for the electrical connection of adjacent cells (series connection of the cells). The separator plates may each have or form structures, which are designed, e.g., for supplying the electrochemical cells arranged between adjacent separator plates with one or more media and/or for removing reaction products. The media may be fuel (e.g., hydrogen or methanol) or reaction gasses (e.g., air or oxygen). Furthermore, the separator plates may have structures for guiding a coolant through the respective separator plate, e.g., for guiding the coolant through a cavity, which is enclosed by the two individual plates forming the separator plate.

The electrochemical cells arranged between the separator plates typically each comprise one or more electrolytic membranes (e.g., in the case of fuel cells) or one or more water exchange membranes (e.g., in the case of humidifying cells). In addition to the membrane, the electrochemical cells may also have gas diffusion layers, which are preferably arranged on both sides of the membrane and which may help improve the rate of a media transfer or a media exchange across the membrane. The gas diffusion layers may be designed, e.g., as metal or carbon non-wovens, also as plastic non-wovens in the case of humidifying cells.

To seal the electrochemical cells and/or to seal the media channels formed by the through-openings in the separator plates with respect to the surroundings or with respect to other areas of the respective electrochemical system, known electrochemical systems typically have sealing elements, which may be molded or embossed into the separator plates, e.g., in the form of sealing beads. The sealing elements of adjacent separator plates of the stack may be mutually supporting one another. For example, an edge area of the electrolytic membrane or the humidifying membrane of the electrochemical cell may thereby be accommodated between the mutually supporting sealing elements of the adjacent separator plates.

The separator plates should be fixable relative to one another with the highest level of accuracy to form the channels and/or sealing elements as precise as possible through the separator plates of the electrochemical system and/or between the separator plates of the electrochemical system. A fuel cell stack with separator plates is known from document U.S. Pat. No. 9,590,263B2, lateral fixing elements having a conical structure being applied on said separator plates as separate components. The conical structures of the fixing elements of adjacent separator plates engage into one another, so that they reduce a displacement of the separator plates relative to one another perpendicular to the stacking direction. The production of these fixing elements and the application of the fixing elements on the separator plates may, however, be material-, labor-, and cost-intensive. In addition, it is difficult to achieve a sufficiently precise fixing of the separator plates relative to one another using the solution disclosed in document U.S. Pat. No. 9,590,263B2.

Based on this, the underlying object of the present invention is to create an electrochemical system having stacked separator plates, which is producible as easy and economical as possible, wherein the separator plates of the system should be positionable relative to one another as accurate as possible.

This problem is solved by an electrochemical system according to the embodiments described. Refinements of the electrochemical system are also described in the embodiments herein.

An electrochemical system is thus proposed, having at least one first and one second separator plate, which each define a plate plane and which are stacked in a stacking direction perpendicular to the plate planes; having a membrane arranged between the first and the second separator plate, in particular an electrolytic membrane or a water exchange membrane, to form an electrochemical cell between the first and the second separator plate; and having at least one sealing element for sealing the electrochemical cell; and having fixing elements for fixing the separator plates with respect to displacements of the separator plates relative to one another parallel to the plate planes of the separator plates.

The fixing elements comprise at least one first fixing element, which is designed to be integral with the first separator plate, is different from the at least one sealing element, is spaced apart from the at least one sealing element in a plane parallel to the plate planes of the separator plates, and projects at least in sections beyond the plate plane of the first separator plate in the stacking direction. The fixing elements additionally comprise at least one second fixing element, which is designed to be integral with the second separator plate, is different from the at least one sealing element, is spaced apart from the at least one sealing element in a plane parallel to the plate planes of the separator plates, and projects at least in sections beyond the plate plane of the second separator plate in the stacking direction. The first fixing element is supported on the second fixing element in such a way that the second fixing element prevents a displacement of the first separator plate relative to the second separator plate in at least one of two opposite directions along an axis or straight line aligned parallel to the plate planes.

Consequently, because the first fixing element is designed to be integral with the first separator plate and the second fixing element is designed to be integral with the second separator plate, the electrochemical system disclosed here is particularly simple and inexpensive to produce. Furthermore, a particularly precise fixing of the separator plates relative to one another may be achieved because in the system disclosed here, unlike known systems with separate fixing elements which first have to be mounted on the separator plates, no corresponding assembly tolerances occur.

The first and the second fixing elements form, e.g., a first fixing element pair. Typically, the fixing elements of the first and the second separator plate comprise additional fixing element pairs of the type of this first fixing element pair, thus in each case having at least one additional first and having at least one additional second fixing element of the type described above. These additional fixing element pairs are then preferably arranged and designed in such a way that the entirety of the fixing element pairs of the first and the second separator plates effect a form fit connection between the first and the second separator plates in all spatial directions parallel to the plate planes of the separator plates.

At least one section of the membrane or at least one section of a frame connected to the membrane and enclosing the membrane may be accommodated and/or pressed between the fixing elements of the first and the second separator plates, in particular between said first fixing element and said second fixing element. In particular, said membrane section or frame section may then be accommodated and arranged in such a way between the fixing elements of the first and the second separator plates, and in particular between said first fixing element and said second fixing element that said membrane section or frame section electrically insulates these fixing elements from one another.

The electrochemical system conventionally comprises a plurality of separator plates of the type described above, which are arranged in a stack. An electrochemical cell, which comprises in each case at least one membrane and is sealed in each case by a sealing element, is then usually arranged between each two adjacent separator plates of the stack. The separator plates of the stack also preferably have in each case fixing elements of the type described above in relation to the first and the second separator plates, wherein at least two fixing elements of adjacent separator plates are supported on one another, as described above, in such a way that they each prevent a displacement of the adjacent separator plates relative to one another in at least one of two opposite directions along an axis or straight line aligned parallel to the plate plane. The fixing element pairs of adjacent separator plates of the stack are thus preferably arranged and designed in such a way that they as a whole engage into one another in a positive locking way in all spatial directions parallel to the plate plane of the separator plates.

In order to effect a positive locking connection between adjacent separator plates in all four spatial directions parallel to the plate plane, the separator plates may each have multiple fixing element pairs of the type described above, which may be arranged in each case on, e.g., opposite edges of the typically at least approximately rectangular separator plates. For example, said first fixing element pair of the first and the second separator plates may be arranged and designed in such a way that it prevents a displacement of the first separator plate relative to a second separator plate in a positive x direction parallel to the plate planes of the separator plates. In addition, e.g., a second fixing element pair of the first and the second separator plates may then be provided, which is arranged and designed in such a way that it also prevents a displacement of the first separator plate relative to the second separator plate in the negative x direction. In this case, the first and the second fixing element pair thus effect a positive locking connection between the first and the second separator plates along the x direction. However, it is also conceivable that the fixing elements of adjacent separator plates are designed in such a way that one pair of fixing elements of adjacent plates engaging into one another effect a positive locking connection in more than one spatial direction parallel to the plate planes, e.g., in each case in at least two or in four spatial directions. Examples of this are explained below in greater detail.

At least one section of the membrane or at least one section of a frame connected to the membrane and enclosing the membrane may be accommodated and/or pressed between the fixing elements of the first and the second separator plates, or between some of them, in particular between said first fixing element and said second fixing element. In particular, said membrane section or frame section may then be accommodated and arranged in such a way between these fixing elements of the first and the second separator plates, so that said membrane section or frame section electrically insulates them from one another. The membrane section or frame section, accommodated between the fixing elements of the first separator plate and the fixing elements of the second separator plate, may, e.g., reduce or prevent slipping of the fixing elements relative to one another. In this way, for example, the sealing effect of the sealing element for sealing the electrochemical cell arranged between the separator plates may be improved. This may increase the efficiency and the lifespan of the system. If the membrane section or frame section is arranged between the fixing elements of the first and the second separator plates in such a way that it electrically insulates them from one another, it is, e.g., not necessary to apply an additional insulation in the area of the fixing elements.

To electrically insulate the fixing elements of the first and the second separator plates from one another, in particular to electrically insulate the first fixing element from the second fixing element, these fixing elements may alternatively or additionally also have an electrically-insulating coating.

The separator plates may each be formed from at least one metal sheet, e.g., in each case from at least one stainless steel sheet. The separator plates may also each comprise two individual plates or may be formed from two individual plates in each case. In this case, each of the individual plates may be formed from a metal sheet, e.g., from a stainless steel sheet. The individual plates may be materially connected to one another, e.g., by welded connections, preferably by laser welded connections, to form the respective separator plate. Typically, the separator plates or the individual plates then have sealing structures and/or channel structures molded into the respective separator plate or into the respective individual plate. For example, these sealing and/or channel structures may be molded into the separator plates or into the individual plates by embossing and/or by deep drawing. The first fixing element and/or the second fixing element may also be molded into the first separator plate, e.g., by embossing and/or by deep drawing.

The at least one sealing element for sealing the electrochemical cell arranged between the separator plates may comprise at least one first sealing element, which is designed to be integral with the first separator plate or with one of the individual plates of the first separator plate. The first sealing element may comprise a first sealing bead molded into the first separator plate or into one of the individual plates of the first separator plate. In addition, the at least one sealing element for sealing the electrochemical cell arranged between the separator plates may comprise at least one second sealing element, which is designed to be integral with the second separator plate or with one of the individual plates of the second separator plate. The second sealing element may comprise a second sealing bead molded into the second separator plate or into one of the individual plates of the second separator plate. The first sealing bead and the second sealing bead may be supported against one another, preferably while accommodating at least in sections the membrane or the frame connected to the membrane and enclosing the membrane between the first sealing bead and the second sealing bead.

Alternatively or additionally, the at least one sealing element for sealing the electrochemical cell arranged between the first and the second separator plates may also comprise a sealing element, e.g., an elastomeric seal, arranged between the first and second separator plates and distinct from the first and second separator plates. This may, for example, be inserted between the separator plates or glued or sprayed onto at least one of the separator plates.

If the separator plates are formed from metal sheets, the plate plane of the respective separator plate is defined, e.g., by the non-shaped areas of the metal sheet from which this separator plate is formed. If the separator plates each comprise two individual plates, the plate plane of each separator plate is defined, e.g., by a connection plane, along which the individual plates, which form this separator plate, are connected to one another.

The fixing elements of the first and/or the second separator plate or at least some of them, in particular thus the first fixing element and/or the second fixing element may be designed in such a way that they project in the stacking direction beyond the at least one sealing element or beyond at least one of the at least one sealing element. This may facilitate and improve the stacking of the separator plates and/or the positioning of the separator plates relative to one another. For example, it may thus be ensured that adjacent separator plates initially contact one another along the fixing elements during stacking. In this way, the fixing elements function as guide elements during stacking, which allow the adjacent separator plates to slide relative to one another into the desired position with high accuracy.

If the first separator plate comprises, e.g., a first sealing bead molded into the first separator plate, the fixing elements of the first separator plate or at least some of them, in particular then the first fixing element, may be designed in such a way that they project beyond this first sealing bead in the stacking direction, e.g., by at least 1.5 times or at least twice as much. Also, if the second separator plate comprises, e.g., a second sealing bead molded into the second separator plate, the fixing elements of the second separator plate or at least some of them, in particular then the second fixing element, may be designed in such a way that they project beyond this second sealing bead in the stacking direction, e.g., by at least 1.5 times or at least twice as much.

For example, the fixing elements of the first and the second separator plates may be arranged and designed in such a way that a certain distance of a plane along the stacking direction, in which plane the fixing elements of the first and of the second separator plates engage in a positive locking way into one another, is greater from the plate plane of the first separator plate than a certain greatest height of the at least one sealing element along the stacking direction and arising from the plate plane of the first separator plate. Also, alternatively or additionally, the fixing elements of the first and the second separator plate may be arranged and designed in such a way that a certain distance of a plane along the stacking direction, in which plane the fixing elements of the first and of the second separator plate engage in a positive locking way with one another, is greater from the plate plane of the second separator plate than a certain greatest height of the at least one sealing element along the stacking direction and arising from the plate plane.

If the first separator plate is formed from two individual plates, the fixing elements of the first separator plate, in particular said first fixing element, may be designed to be integral with at least one or with precisely one of the individual plates forming the first separator plate. If the second separator plate is formed from two individual plates, the fixing elements of the second separator plate, in particular said second fixing element, may be designed to be integral with at least one or with precisely one of the individual plates forming the second separator plate.

The fixing elements, in particular said first and second fixing elements, may each be arranged on a side of the at least one sealing element facing away from the electrochemical cell sealed by the at least one sealing element or on side of the at least one sealing element facing away from the electrochemically active area sealed by the at least one sealing element. In other words, the fixing elements, in particular said first and second fixing elements, and the electrochemically active area of the separator plates may each be arranged on different sides of the at least one sealing element. It may thus be ensured that the fixing elements do not affect the flow to the membrane and/or the media transfer across the membrane.

The fixing elements, in particular said first and second fixing elements, may be elastic at least in areas, in particular perpendicular and/or parallel to the plate planes of the separator plates. The fixing elements, in particular said first and second fixing elements, may be configured to follow a change of a certain distance of the separator plates from one another along the stacking direction by changing their shape and/or their orientation. A change of the distance of the separator plates from one another may be caused, e.g., by a change of the operating temperature of the system, which may cause, at least in areas, an in particular temporary deformation of the separator plates and/or of the at least one sealing element for sealing the electrochemical cell arranged between the separator plates. Due to the elasticity of the fixing elements, it is thus ensured that the fixing elements satisfy their function across a broad temperature range of the system.

The fixing elements or at least some of the fixing elements, in particular said first and second fixing elements, may be designed as shaped extensions of the respective separator plate integrally with the respective separator plate. Also, if the separator plates each comprise two individual plates connected to one another, fixing elements or at least some of the fixing elements, in particular said first and second fixing elements, may correspondingly be designed as shaped extensions of the respective individual plate integrally with at least one of the individual plates. In this case, it is conceivable that respectively precisely only one of the individual plates of the separator plates or at least some of the separator plates have fixing elements in the shape of extensions of these individual plates. Alternatively, however, in this case respectively both of the individual plates of the separator plates or at least some of the separator plates may also have fixing elements in the shape of extensions of these individual plates.

The fixing elements designed as extensions of the separator plates or of the individual plates, in particular said first and second fixing elements, may be angled at least in sections relative to the plate plane of the respective separator plate. In these sections of the fixing elements, angled with respect to the plate plane, the fixing elements typically have a straight course. For example, the angle, which the fixing elements, in particular said first and second fixing elements, define with the plate plane of the respective separator plate or with a plane parallel to the plate plane of the respective separator plate, is between 91 degrees and 135 degrees at least in sections, preferably between 100 degrees and 120 degrees at least in sections. If the fixing elements, in particular said first and second fixing elements, are designed as extensions of the separator plates or as extensions of the individual plates, they may be arranged nested in one another at least in areas while accommodating said membrane section or frame section between the fixing elements of the first and the second separator plates or be electrically insulated from one another by at least one coating.

The fixing elements, designed as extensions of the separator plates or of the individual plates, or at least some of them, in particular said first and second fixing elements, may be arranged in a corner area of the respective separator plate. They may then additionally be designed in such a way that their cross section in a plane parallel to the plate planes takes on, at least in sections, the shape of a curved line, for example, the shape of a circular arc line or an elliptical arc line. These extensions arranged in the corner area may also expand conically, at least in sections, in the stacking direction, e.g., in the form of a conical segment. Furthermore, the extensions arranged in the corner area may be designed in such a way that sections with straight cross sections connect to the section with the curved cross section.

The first and the second separator plates may each have fixing elements in the form of extensions in the same corner area. These may be angled with respect to the plate planes in the same direction along the stacking direction and may, as described, each have a cross section curved at least in sections and parallel to the plate planes. Correspondingly designed fixing elements of the first and the second separator plates may then, if necessary, be arranged nested along the stacking direction while accommodating the membrane section or frame section.

The fixing elements, designed as extensions of the separator plates or as extensions of the individual plates, of the first and the second separator plates or at least some of them, in particular said first and second fixing elements, may have a U- or V-shaped cross section, at least in one section along the stacking direction, in a plane aligned perpendicular to the plate planes of the separator plates. In doing so, the legs of this U- or V-shaped cross section may have, in particular, different lengths. These fixing elements of the first and the second separator plates with the U- or V-shaped cross section may, if necessary, be arranged nested in another, while accommodating said membrane section or frame section between these fixing elements in such a way, that they each effect a positive locking connection in two spatial directions parallel to the plate planes of the first separator plate and of the second separator plate.

To increase their stiffness, the fixing elements, designed as extensions of the separator plates or as extensions of the individual plates, or at least some of them, in particular said first and second fixing elements, may each have a bead-like depression. This may have, e.g., an elongated shape and respectively follow the course of the angled and preferably straight section of the respective extension with respect to the plate planes of the separator plates. The stability of the extensions may be increased and the fixing of the separator plates relative to one another may be more improved by corresponding bead-like depressions.

At least one of the fixing elements of the first separator plate, in particular said first fixing element, may have a first raised area facing the second separator plate. This first raised area may be molded, in particular embossed, e.g., into the first separator plate or into one of the individual plates of the first separator plate. Also, at least one of the fixing elements of the second separator plate, in particular said second fixing element, may have a second raised area facing the first separator plate. This second raised area may be molded, in particular embossed, into the second separator plate or into one of the individual plates of the second separator plate. The second raised area of the second separator plate may have a depression which has a shape complementary at least in areas to the first area of the first separator plate. The first raised area of the first separator plate may then be accommodated at least in areas in the depression of the second raised area of the second separator plate, namely while accommodating the membrane section or frame section between the first elevation and the depression formed in the second elevation. A positive locking connection may, e.g., be effected in each case in two independent directions parallel to the plate planes of the separator plates by corresponding fixing elements of the first and the second separator plates accommodated in one another at least in areas.

Advantageously, all separator plates of an electrochemical system are designed identically, as this reduces the production costs. However, it is possible that the first and/or the last of the separator plates of a separator plate stack of an electrochemical system are configured as deviating from this, thus, for example, have no fixing elements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Exemplary embodiments of the electrochemical system disclosed here are depicted in the figures and are explained in greater detail in the following description. Different elements, either essential to the invention or also advantageously refining elements, are thereby listed within the context of a specific example in each case, whereby each one of these elements as such may be used for refining the invention—also extracted from the context of the respective example and from additional features of the respective example. The same or similar reference numerals are used in the figures for the same or similar elements. In the drawings:

FIG. 3A schematically shows a section from the stack of the system according to FIG. 1 according to a second embodiment in a sectional view;

FIG. 3B schematically shows a perspective view of the section from FIG. 3A;

FIG. 4A schematically shows a section from the stack of the system according to FIG. 1 according to a third embodiment in a sectional view;

FIG. 4B schematically shows a perspective view of the section from FIG. 4A;

FIG. 5A schematically shows a section from the stack of the system according to FIG. 1 according to a third embodiment in a sectional view;

FIG. 5B schematically shows a perspective view of the section from FIG. 5A;

DETAILED DESCRIPTION

Figure 1:
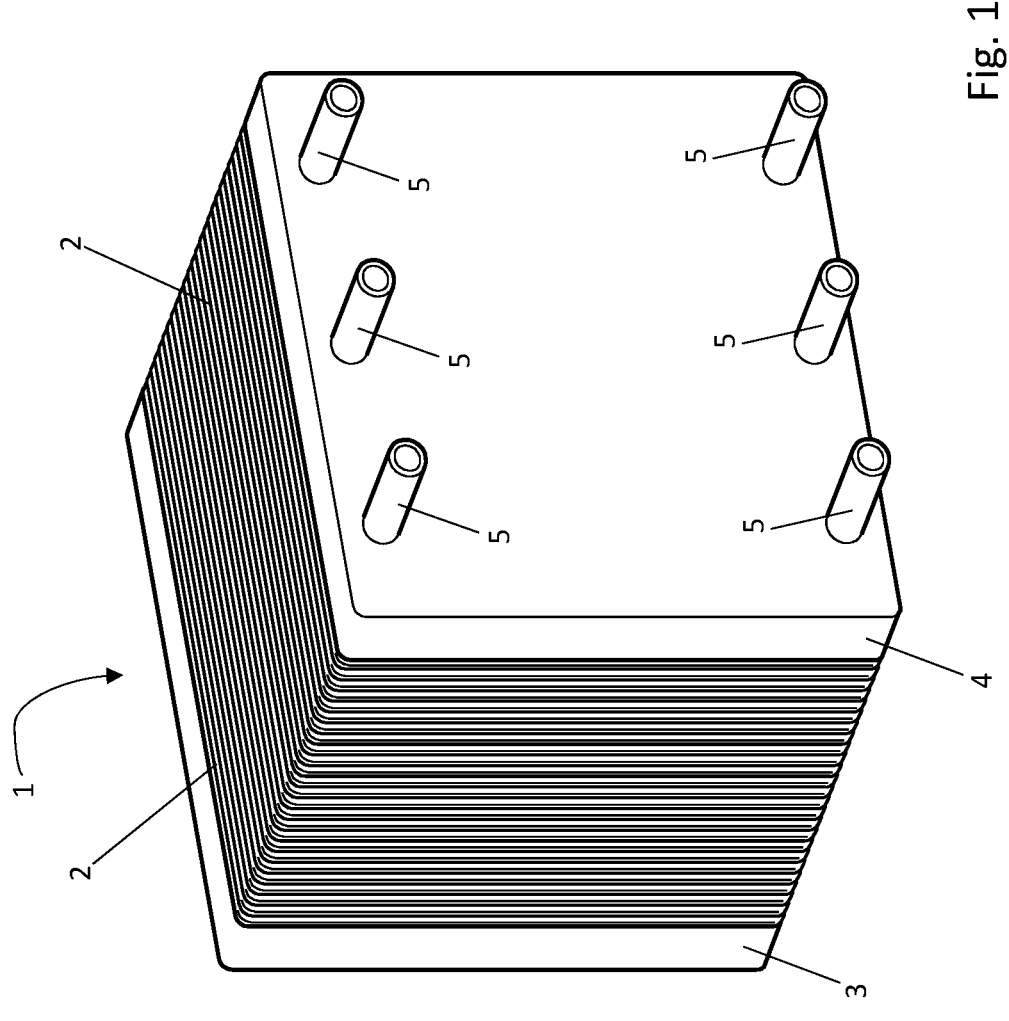
FIG. 1 schematically shows an electrochemical system according to the described embodiments have a plurality of separator plates which are arranged in a stack.
Figure 1:
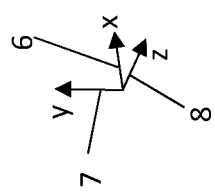

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 shows an electrochemical system 1 according to the described embodiments having a plurality of identical metal separator plates 2, which are arranged in a stack and stacked along a z-direction 8. The separator plates 2 of the stack are clamped between two end plates 3, 4. The z-direction 8 is also called the stacking direction. The separator plates 2 each comprise two individual plates connected to one another (see, e.g., FIG. 2A). In the present example, the system 1 is a fuel cell stack. Each two adjacent separator plates 2 of the stack thus enclose between themselves an electrochemical cell which functions, e.g., for converting chemical energy into electrical energy. The electrochemical cells usually each have a membrane electrode assembly (MEA), (see, e.g., FIG. 2A). The MEAs typically each contain at least one membrane, e.g., an electrolytic membrane. Furthermore, the MEAs may each have gas diffusion layers (GDL) arranged on both sides of the membrane.

In alternative embodiments, the system 1 may likewise be designed as an electrolyzer, compressor, or as a redox flow battery. In these electrochemical systems, separator plates may likewise be used. The structure of these separator plates may then correspond to the structure of the separator plates 2, explained in greater detail here, even if the media guided onto or through the separator plates in the case of an electrolyzer, in the case of a compressor, or in the case of a redox flow battery respectively may differ from the media used for a fuel cell system.

The z-axis 8, together with an x-axis 6 and a y-axis 7, spans a Cartesian coordinate system with the origin in the lower left corner. The end plate 4 has a plurality of media connections 5, via which media are suppliable to the system 1 and via which media are dischargeable out of the system 1. These media, suppliable to system 1 and dischargeable out of system 1, may, e.g., comprise fuels like molecular hydrogen or methanol, reaction gases like air or oxygen, reaction products like water vapor, or coolants like water and/or glycol.

Figures 2A, 2B:
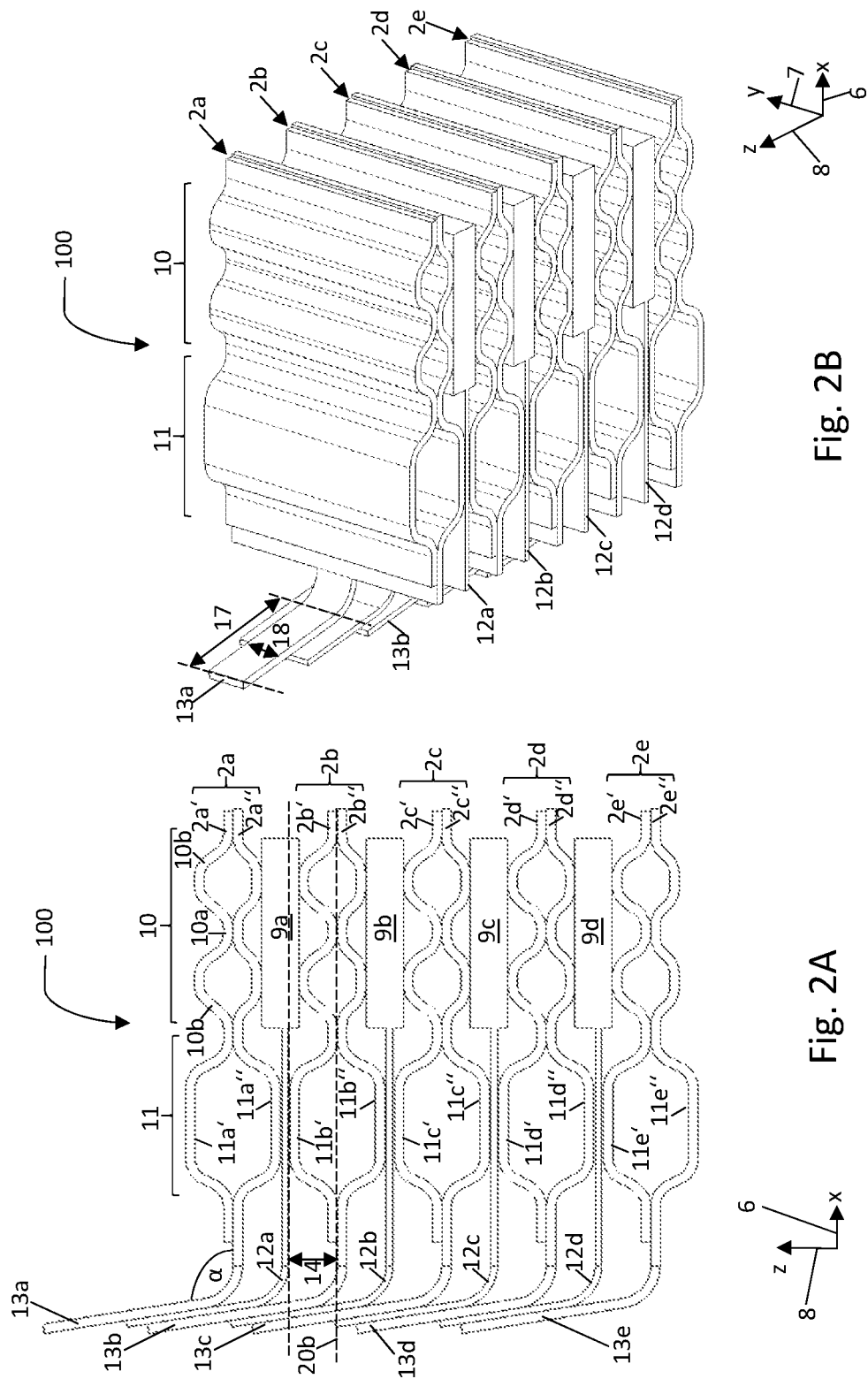
FIG. 2A schematically shows a section from the stack of the system according to FIG. 1 according to a first embodiment in a sectional view.
FIG. 2B schematically shows a perspective view of the section from FIG. 2A.
Figure 2C:
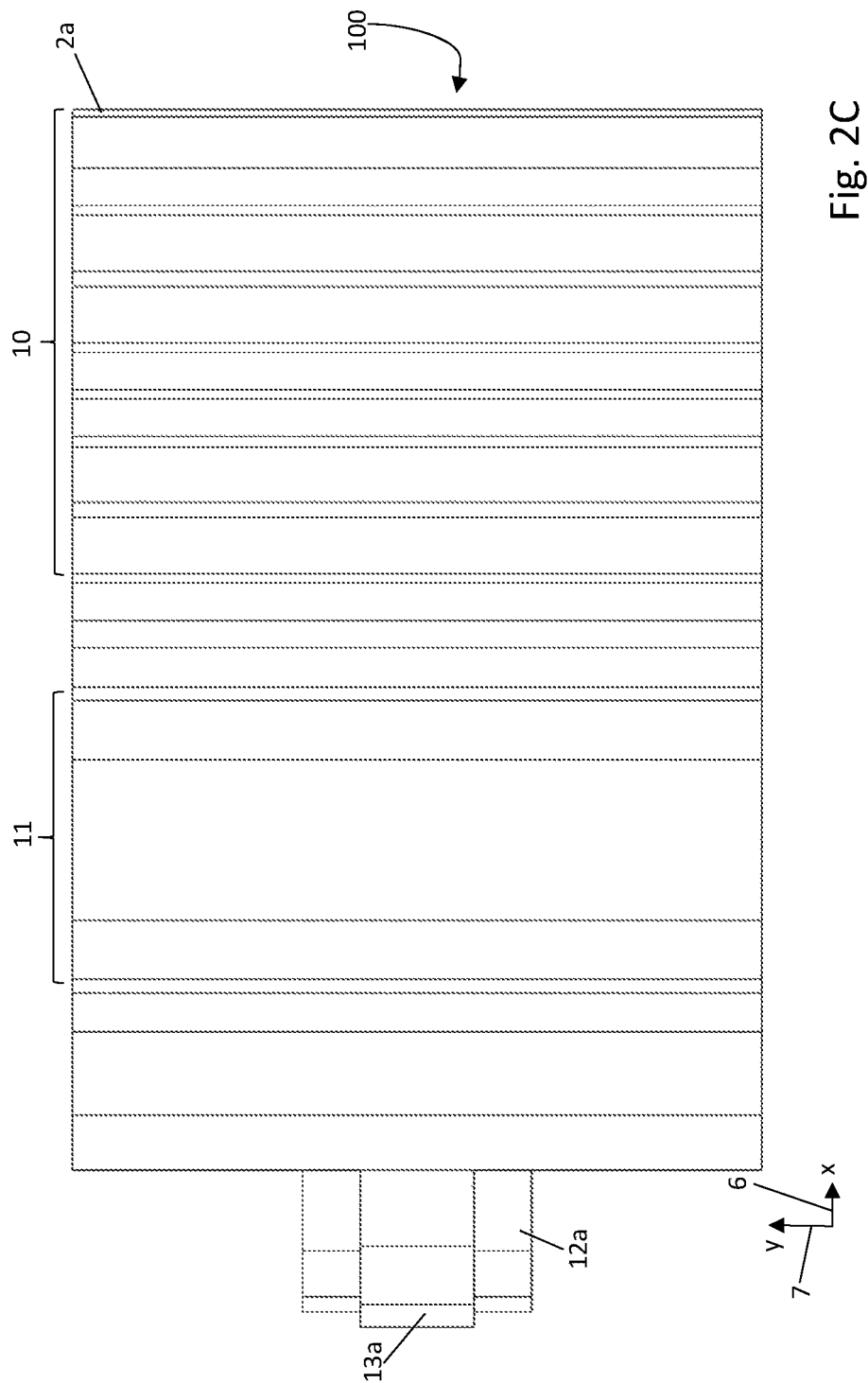
FIG. 2C schematically shows the section from FIG. 2A.

FIGS. 2A-C schematically show a section of a stack 100 of the electrochemical system 1 shown in FIG. 1 according to a first embodiment. FIG. 2A shows a sectional view of this section, wherein the section plane is aligned parallel to the x-z plane. FIG. 2B shows a perspective view of the section depicted in FIG. 2A. And FIG. 2C shows a top view of the section depicted in FIGS. 2A and 2B, wherein the line of sight is aligned along stacking direction 8.

The stack section depicted in FIGS. 2A-C shows a plurality of separator plates 2a-e, which are stacked along stacking direction 8. Separator plates 2a-e of the stack 100 are designed identically in this case. However, it is likewise conceivable that the stack 100 comprises two different types of separator plates, which are, for example, arranged alternatingly. The separator plates 2a-e each comprise two individual plates connected to one another, designated here with 2a', 2a", 2b', 2b", etc. The individual plates of the separator plates are each formed from metal sheets, for example stainless steel sheets, which may be coated at least in sections. These metal sheets each usually a thickness of less than 150 μm or less than 100 μm. The individual plates are each typically materially connected to one another, e.g., by welded connections, particularly by laser welded connections. The plate planes of the separator plates 2a-e are aligned perpendicular to the stacking direction 8, thus parallel to the x-y plane. The plate planes of the separator plates 2a-e may be defined, for example, by the planes, along which the individual plates of the separator plates are connected to one another. Thus, in FIG. 2A, as an example, the plate plane 20b of the separator plate 2b is highlighted by a dashed line.

In an electrochemically active area 10 of the separator plates 2a-e, the separator plates each have structures for carrying media, which are, e.g., embossed into the individual plates of separator plates 2a-e. These structures for carrying media may comprise, for example, channels 10a and webs 10b delimiting channels 10a. Furthermore, an electrochemical cell, which respectively comprises a membrane electrode assembly (MEA), is arranged in active area 10 of separator plates 2a-e in each case between two adjacent separator plates. The MEAs are designated here as 9a-d. MEAs 9a-d each comprise a membrane, in particular in the form of an electrolytic membrane, in the embodiment shown here. Furthermore, MEAs 9a-d may each have gas diffusion layers (GDLs) arranged on both sides of the membrane. The GDLs facilitate that the membranes of MEAs 9a-d may also be flowed against in the area of webs 10b of the active area 10 and thus improve the media exchange across the membranes of MEAs 9a-d.

To seal the electrochemical cells arranged between the separator plates 2a-e, the separator plates have sealing elements in the form of the sealing beads 11a', 11a'', 11b', 11b'', etc. embossed into the individual plates 2a', 2a'', 2b', 2b'', etc. of the stack 100 in a sealing area 11. The sealing beads 11a', 11a'', 11b', 11b'', etc. have a certain height 14 along the stacking direction 8 and from the respective plate plane, which height is highlighted by way of example in FIG. 2A for the sealing bead 11b' of the individual plate 11b—the material thickness of the individual plate 11b is included herein. To seal the electrochemical cells, sealing area 11 with the sealing beads 11a', 11a'', 11b', 11b'', etc. completely surrounds active area 10 (not shown here). Each two sealing beads are thereby mutually supported on facing sides of adjacent separator plates, namely in each case while accommodating a frame, which is connected to the membrane of the MEA arranged between the respective separator plates and which surrounds this membrane, between the respective sealing beads. These frames are designated in FIG. 2A with 12a-d. Thus, in FIG. 2A, the sealing bead 11a'', embossed into the individual plate 2a'' of the separator plate 2a, is supported against the sealing bead 11b', embossed into the individual plate 2b' of the separator plate 2b, wherein the frame 12a, which surrounds the membrane of MEA 9a arranged between the separator plates 2a and 2b, is accommodated between the sealing beads 11a'' and 11b', etc.

In alternative embodiments, which are not explicitly depicted here, different sealing elements may be provided instead of the sealing beads 11a', 11a'', 11b', 11b'', etc. for likewise sealing the electrochemical cells from the separator plates 2a-e, e.g., in the form of elastomer seals arranged between each two adjacent separator plates. These may each, e.g., be inserted between the separator plates or glued or sprayed onto the separator plates.

The separator plates 2a-e additionally have fixing elements 13a-e, which have the function of positioning and fixing the separator plates 2a-e relative to one another and parallel to the plate planes of separator plates 2a-e. In the first embodiment of the stack 100 shown in FIG. 2A, the fixing elements 13a-e are designed as extensions of the separator plates 2a-e at the edge of the separator plates 2a-e. Each of the fixing elements 13a-e in FIG. 2A is defined by an extension of respectively precisely one of individual plates 2a'', 2b'', 2c'', 2d'', 2e'' of the separator plates 2a-e of the stack 100 and is designed in each case to be integral with these individual plates. Integrality means here in particular that the at least one fixing element is produced integrally with the corresponding individual plate, thus is not added on. Thus, it also mandates a uniformity of material, wherein, however, the thickness, for example, does not have to be consistent throughout.

The fixing elements 13a-e are each arranged on one of the sides of the sealing beads 11a', 11a'', 11b', 11b'', etc. facing away from the active area 10. The fixing elements 13a-e are distinct from the sealing beads 11a', 11a'', 11b', 11b'', etc. and are spaced apart from the same in a direction parallel to the plate planes of the separator plates 2a-e, in particular along the x-direction 6 in FIG. 2A.

The extensions of the individual plates 2a'', 2b'', 2c'', 2d'', 2e'' forming the fixing elements 13a-e are each curved with respect to the plate planes of the individual plates toward the stacking direction, in particular toward the positive z-direction 8 in FIG. 2A. The curved ends of the fixing elements 13a-e forming extensions of the separator plates 2a-e extend straight at least in sections. The sections of fixing elements 13a-e, extending straight in the cross section shown, each define an angle α with the plate planes of separator plates 2a-e or with planes extending parallel to the plate planes of separator plates 2a-e. In FIG. 2A, the angle α has a value of approximately 100 degrees. In variations of the embodiment shown here, the angle α may also assume other values, e.g., 91 degrees≤α≤135 degrees or 100 degrees≤α≤120 degrees.

The fixing elements of a defined separator plate project beyond the sealing elements of the same separator plate perpendicular to the plate planes of the separator plates 2a-e, starting from the plate plane of the respective separator plate, e.g., by at least 1.1 times, at least by 1.5 times, or at least by twice the maximum height of the sealing elements of this separator plate. Thus, in FIG. 2A, the fixing element 13b of the separator plate 2b projects beyond height 14 of the sealing bead 11b' of the separator plate 2b along the stacking direction 8, in this case, e.g., by at least three times height 14.

The fixing elements 13a-e of the separator plates 2a-e of the stack 100 are nested in one another. In the embodiment shown here, in each case at least one section or an extension of the frame is thereby accommodated and pressed between the fixing elements of adjacent separator plates, said frame is connected to the membrane of the MEA arranged between the respective separator plates and surrounds this membrane. Thus, in FIG. 2A, e.g., the frame 12a is accommodated and pressed between the fixing element 13a of the separator plate 2a and the fixing element 13b of the separator plate 2b, said frame is connected to the membrane of MEA 9a, which is arranged between the separator plates 2a and 2b.

Correspondingly, frame 12b is accommodated and pressed between fixing elements 13b and 13c of the separator plates 2b and 2c, etc.

Frames 12a-d are each accommodated between the fixing elements 13a-e of the separator plates 2a-e in such a way that these frames extend across at least the entire overlapping area of the fixing element respectively contacting them, and thus electrically insulate said fixing elements completely from one another. It is clearly recognizable in FIG. 2B, that the frame 12a is accommodated and arranged between the fixing elements 13a and 13b in such a way that it extends across the entire area in which the fixing elements 13a and 13b overlap one another and might come into contact. In this way, the section of frame 12a accommodated between the fixing elements 13a and 13b prevents that an undesired electrical short circuit occurs between the separator plates 2a and 2b or between the individual plates 2a'' and 2b'' in the area of the fixing elements 13a and 13b.

The nesting of fixing elements 13a-e of separator plates 2a-e effects that the fixing elements of adjacent separator plates support one another while accommodating in each case one of the frames 12a-d between said fixing elements. In FIG. 2A, the fixing element 13a of the separator plate 2a is supported, e.g., on the fixing element 13b of the separator plate 2b in such a way, namely while accommodating the frame 12a between the fixing elements 13a and 13b, that the fixing element 13b prevents a displacement of the first separator plate 2*a* relative to the second separator plate 2*b* parallel to the plate planes of the separator plates 2*a-e* in the negative x-direction 6.

Not shown in FIG. 2A are fixing elements, corresponding to the fixing elements 13*a-e*, on a side of the separator plates 2*a-e* opposite the fixing elements 13*a-e* along the x-direction 6, which are supported on one another in a corresponding way and prevent a displacement of the separator plates 2*a-e* relative to one another parallel to the plate planes of the separator plates 2*a-e* in the positive x-direction 6. In addition, the separator plates 2*a-e* preferably have additional fixing elements, corresponding to the fixing elements 13*a-e*, which are arranged along opposite sides of the separator plates 2*a-e* along the y-direction 7. The fixing elements arranged on all sides of the separator plates 2*a-e* mutually generate in each case a positive locking connection between adjacent separator plates of the stack 100 in the x-y plane. In this way, the fixing elements 13*a-e* contribute to positioning and fixing the separator plates 2*a-e* relative to one another. The fixing elements 13*a-e* are designed to be elastic at least in parts so that they may follow a change of a certain distance of the separator plates 2*a-e* from one another along the stacking direction 8 by changing their shape and/or their alignment. For example, the angle α, about which the straight ends of the fixing elements 13*a-e* are angled with respect to the plate planes of the separator plates 2*a-e*, may be marginally variable as a result of the elasticity of the fixing elements 13*a-e*. The elasticity of the extensions of the separator plates 2*a-e* or of the individual plates 2*a*", 2*b*", 2*c*", 2*d*", 2*e*" forming the fixing elements 13*a-e* may be provided, e.g., in that their length is respectively greater than their width. E.g., a length 17 of the fixing elements 13*a-e* may be in each case at least three times or at least five times as great as a width 18 of the fixing elements 13*a-e* (see FIG. 2B). The length 17 of the fixing elements 13*a-e* may be determined, e.g., along the straight ends of the fixing elements. The width 18 of the fixing elements 13*a-e* may be determined, e.g., parallel to the plate planes of the separator plates 2*a-e* and perpendicular to the thickness direction of the separator plates 2*a-e* or of the individual plates 2*a*", 2*b*", 2*c*", 2*d*", 2*e*", from which the fixing elements 13*a-e* are formed.

The fixing element 13*a* and the section of the frame 12*a*, arranged between the fixing element 13*a* and the fixing element 13*b*, and the sealing area 11 and the active area 10 are shown, in particular, in the top view from FIG. 2C.

Figure 3C:
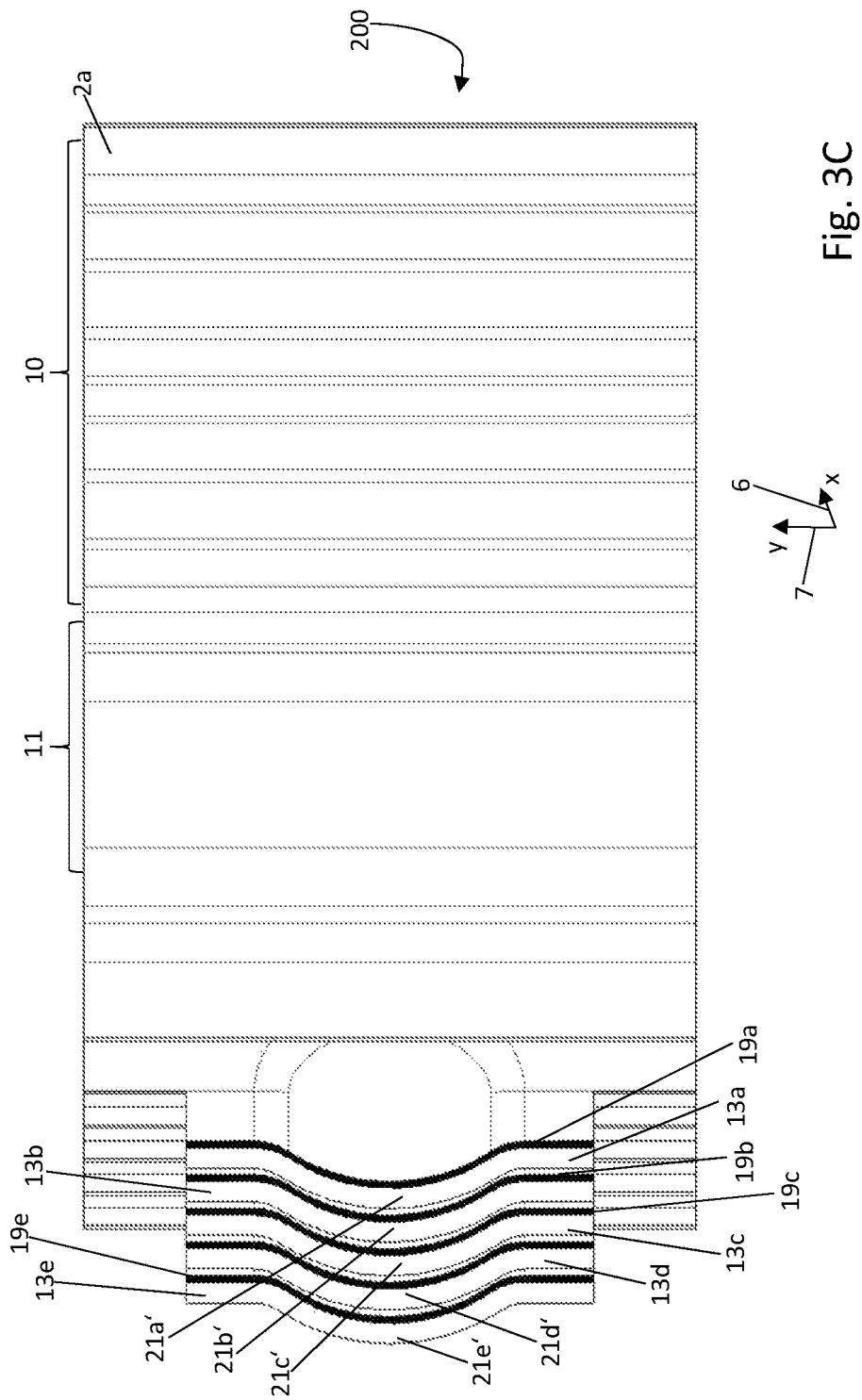
FIG. 3C schematically shows the section from FIG. 3A.

FIGS. 3A-C schematically show a section of a stack 200 of the electrochemical system 1 shown in FIG. 1 according to a second embodiment. FIG. 3A shows a sectional view of this section, wherein the section plane is aligned parallel to the x-z plane. FIG. 3B shows a perspective view of the section from FIG. 3A. FIG. 3C shows a top view of the section depicted in FIGS. 3A and 3B. However, unlike FIG. 2C, the line of sight in FIG. 3C is not aligned along the stacking direction 8, but instead along a direction, angled by angle the α with respect to the plate planes of the separator plates 2*a-e*, which direction is aligned parallel to the straight ends of the fixing elements 13*a-e*.

The stack 200 according to FIGS. 3A-C differs from the stack 100 according to FIGS. 2A-C in that the extensions of the individual plates 2*a*", 2*b*", 2*c*", 2*d*", 2*e*" forming the fixing elements 13*a-e* have bead-like depressions 21*a*', 21*b*', 21*c*', 21*d*', 21*e*' (see FIG. 30 to increase their stiffness. Bead-like depression 21*a*' embossed into the fixing element 13*a* is particularly clearly recognizable in FIG. 3B. In FIG. 3A, only the bead-like depressions 21*a*' and 21*e*' of the fixing elements 13*a* and 13*e* are explicitly highlighted for the sake of clarity. The bead-like depressions 21*a*', 21*b*', 21*c*', 21*d*', 21*e*' of the fixing elements 13*a-e* of the stack 200 each have an elongated shape and follow the course of the straight ends of the fixing elements 13*a-e*. It may be gathered from the depiction of FIG. 3C that the bead-like depressions are nested in one another. The depressions 21*a*', 21*b*', 21*c*', 21*d*', 21*e*', nested in one another, of the fixing elements 13*a-e* additionally effect a positive locking connection along the y-direction 7 between adjacent separator plates of the stack 200. Unlike stack 100 of FIGS. 2A-C, the frames 12*a-d* of the stack 200 are not accommodated between the fixing elements 13*a-e* according to FIGS. 3A-C. In order to electrically insulate the fixing elements 13*a-e* of adjacent separator plates of the stack 200 from one another, the fixing elements 13*a-e* of the stack 200 each have an electrically insulating coating 19 on at least one side. For example, in the stack 200 according to FIGS. 3A-C, the extensions of the individual plates 2*a*", 2*b*", 2*c*", 2*d*", 2*e*" forming the fixing elements 13*a-e* each have an electrically-insulating coating 19*a-e* on at least the side facing in the positive z-direction 8 and facing in the positive x-direction 6.

Figure 4C:
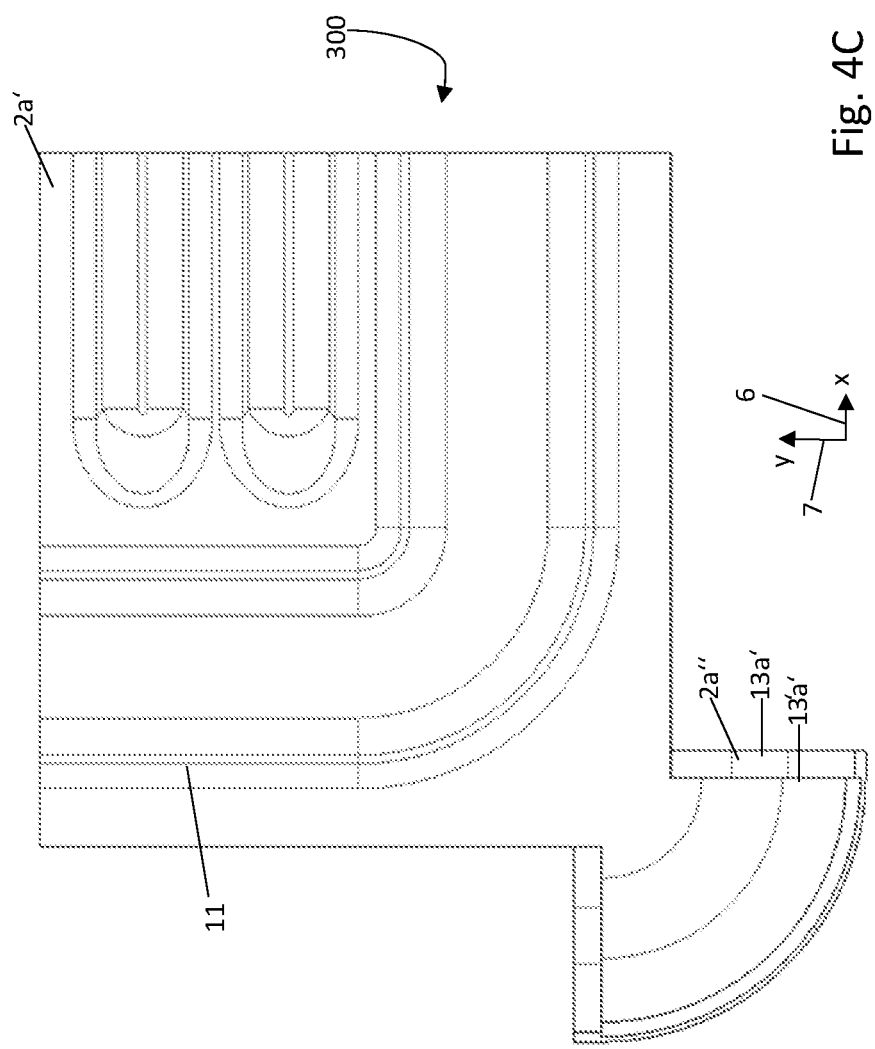
FIG. 4C schematically shows the section from FIG. 4A.

FIGS. 4A-C schematically show a section of a stack 300 of the electrochemical system 1 shown in FIG. 1 according to a third embodiment. FIG. 4A shows a sectional view of this section, wherein the section plane is aligned parallel to the x-z plane. FIG. 4B shows a perspective view of the section from FIG. 4A. And FIG. 4C shows a top view of the section depicted in FIGS. 4A and 4B, wherein the line of sight is aligned along the stacking direction 8 like in FIG. 2C.

The stack 300 according to FIGS. 4A-C differs from the stack 100 according to FIGS. 2A-C in that the separator plates 2*a-e* each have two fixing elements, of which each is formed by an extension of precisely one of the individual plates of the respective separator plate. Thus, the separator plate 2*a* has a first fixing element 13*a*' formed by an extension of the individual plate 2*a*' and a second fixing element 13*a*" formed by an extension of the individual plate 2*a*". The separator plate 2*b* has a first fixing element 13*b*' formed by an extension of the individual plate 2*b*' and a second fixing element 13*b*" formed by an extension of the individual plate 2*b*", etc. The fixing elements 13*a*', 13*a*", 13*b*', 13*b*" etc. of the stack 300 are curved with respect to the plate planes of the separator plates 2*a-e* in the same direction parallel to the stacking direction 8. In each case, the fixing elements of the individual plates facing one another of adjacent separator plates are nested in one another, namely as before, while accommodating one of the frames 12*a-d* or in each case while accommodating at least one section of one of the frames 12*a-d* between these fixing elements. Thus, the fixing element 13*a*" of the separator plate 2*a* and the fixing element 13*b*' of the separator plate 2*b* are nested in one another while accommodating the frame 12*a* between the fixing elements 13*a*" and 13*b*'. The fixing element 13*b*" of the separator plate 2*b* and the fixing element 13*c*' of the separator plate 2*c* are nested in one another while accommodating the frame 12*b* between the fixing elements 13*b*" and 13*c*', etc.

Unlike in the stack 100 according to FIGS. 2A-C, the fixing elements 13*a*', 13*a*", 13*b*', 13*b*", etc. of the stack 300 according to FIGS. 4A-C are each arranged in corner areas of the separator plates 2*a-e*. The fixing elements 13*a*', 13*a*", 13*b*', 13*b*", etc. of the stack 300 are additionally each designed in such a way that their cross section has a curved or an arc-shaped course, e.g. in the form of a circular arc, parallel to the plate planes of the separator plates 2*a-e* at least in one section along the stacking direction 8. Furthermore, the extensions forming the fixing elements 13*a*', 13*a*", 13b', 13b", etc. of the stack 300 are conical at least in sections in the stacking direction 8.

Due to the curved cross section of the fixing elements 13a', 13a", 13b', 13b", etc. of the stack 300, and due to their arrangement in the corner areas of the separator plates 2a-e, the adjacent fixing elements of adjacent separator plates lean in to one another in two directions, for example, the fixing elements 13a" and 13b'. For the positive locking—yet reversible—connection of the separator plates 2a-e in all four spatial directions parallel to the plate planes of the separator plates, the separator plates 2a-e of the stack 300 preferably each have at least two pairs of fixing elements of the type shown in FIGS. 4A-C at diagonally opposite corners of the separator plates 2a-e.

Figure 5C:
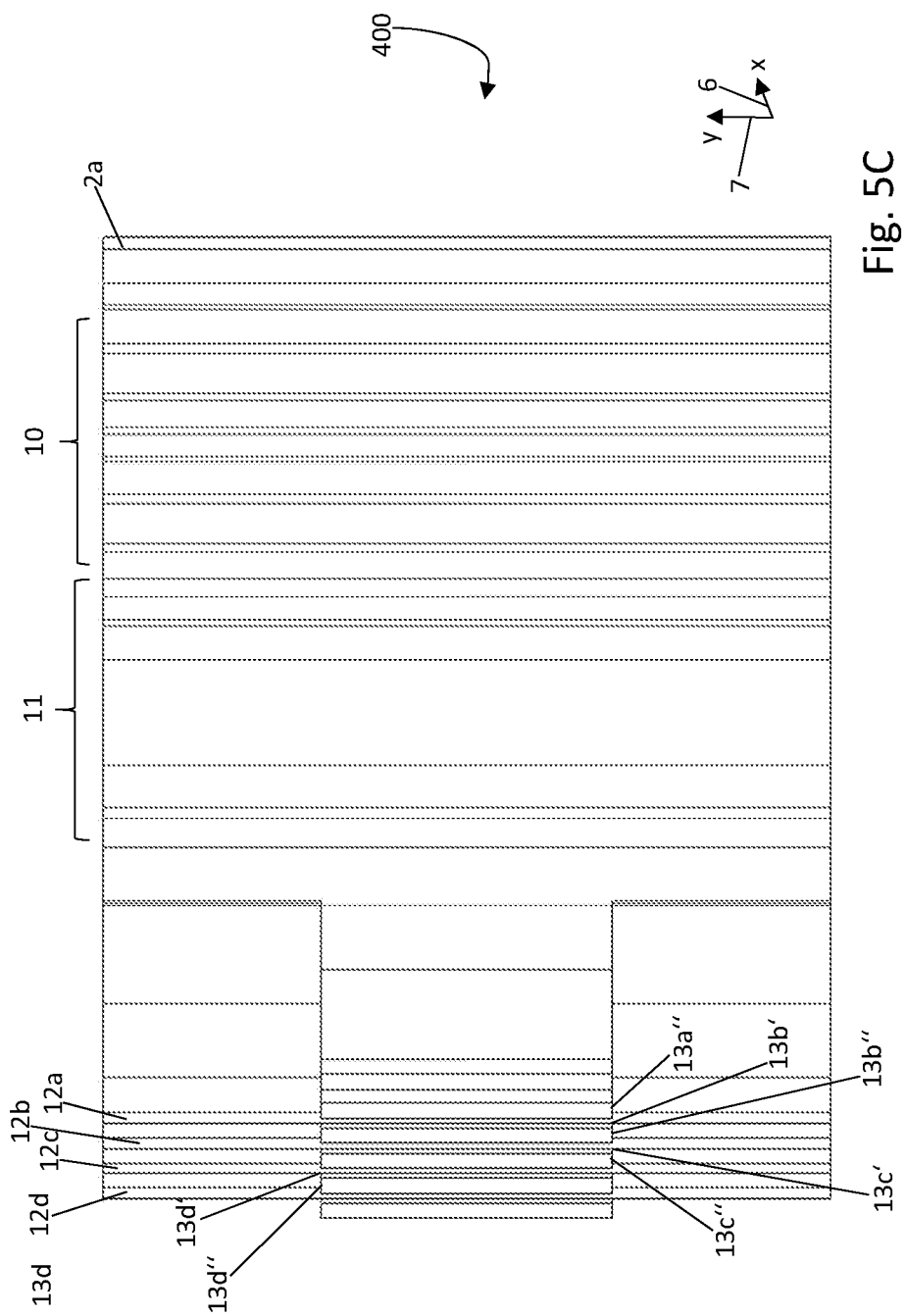
FIG. 5C schematically shows the section from FIG. 5A in a top view.

FIGS. 5A-C schematically show a section of a stack 400 of the electrochemical system 1 shown in FIG. 1 according to a fourth embodiment. FIG. 5A shows a sectional view of this section, wherein the section plane is aligned parallel to the x-z plane. FIG. 5B shows a perspective view of the section depicted in FIG. 5A. FIG. 5C shows a top view on the section depicted in FIGS. 5A and 5B, wherein the line of sight is aligned, as in FIG. 3C, along a direction angled by the angle α with respect to the plate planes of the separator plates 2a-e, which direction extends parallel to the straight ends of the fixing elements 13a', 13a", 13b', 13b", etc. of the stack 400.

As in the stack 300 according to FIGS. 4A-C, each of the separator plates 2a-e of the stack 400 according to FIGS. 5A-C respectively has two fixing elements, of which each is formed by an extension of precisely one of the individual plates of the respective separator plate, wherein these extensions are arranged, e.g., laterally on the edges of the separator plates 2a-e, similar to the fixing elements 13a-e of the stack 100 according to FIGS. 2A-C.

The extensions of the individual plates 2a', 2a", 2b', 2b", etc. of the stack 400 forming the fixing elements 13a', 13a", 13b', 13b", etc. each have a U- or V-shaped cross section, at least in one section along the stacking direction 8, in the x-z plane aligned perpendicular to the plate planes of the separator plates 2a-e. However, the U- or V-shape is thereby not designed symmetrically. The outer, straight ends of the extensions of the individual plates 2a', 2a", 2b', 2b", etc. of the stack 400 forming the fixing elements 13a', 13a", 13b', 13b", etc. are thereby each curved in the same direction along the stacking direction 8, in this case in the positive z-direction, and define in each case the same angle α with the plate planes of the separator plates 2a-e. To increase the stability of the fixing elements 13a', 13a", 13b', 13b", etc., the outer, straight ends of the fixing elements of the individual plates of the same separator plate are each mutually supported at least in sections and may optionally be connected to one another along this section, e.g., by a material connection, in particular by a welded connection. Thus, e.g., the outer straight ends of the extensions of the individual plates 2a', 2a" of the separator plate 2a forming the fixing elements 13a', 13a" mutually support one another at least in sections. The outer straight ends of the extensions of the individual plates 2b', 2b" of the separator plate 2b forming the fixing elements 13b', 13b" mutually support one another at least in sections, etc.

While in the depicted embodiment, the fixing elements 13a", 13b", etc. of the individual plates 2a", 2b", etc. project farther from the plate plane 20a, 20b, etc. than the fixing elements 13a', 13b', etc. of the individual plates 2a', 2b', etc., i.e., are longer overall, as is illustrated by way of example by means of the arrows 15a" and 15a', embodiments deviating from this are also possible. In the case of the embodiment shown here, it is essential that the frames 12a, 12b, etc. always project at least as far as the shorter of the two fixing elements contacting said frame, so that said frame completely electrically insulates them.

Similar to the stack 300 according to FIGS. 4A-C, each of the fixing elements of the individual plates facing one another of adjacent separator plates are thereby nested in one another, namely as before, while accommodating in each case one of the frames 12a-d or in each case one section of one of the frames 12a-d between these fixing elements. Thus, the fixing element 13a" of the individual plate 2a" of the separator plate 2a and the fixing element 13b' of the individual plate 2b' of the separator plate 2b are nested in one another while accommodating the frame 12a between the fixing elements 13a" and 13b'. The fixing element 13b" of the individual plate 2b" of the separator plate 2b and the fixing element 13c' of the individual plate 2c' of the separator plate 2c are nested in one another while accommodating the frame 12b between the fixing elements 13b" and 13c', etc.

The fixing elements, shaped as U- or V-shaped in cross section, of the individual plates facing one another of adjacent separator plates are thereby each nested in one another in such a way that they effect a fixing of the separator plates parallel to the plate planes of the separator plates 2a-e in both orientations of the x-direction 6. E.g., the fixing element 13a" of the individual plate 2a" of the separator plate 2a is supported on the fixing element 13b' of the individual plate 2b' of the separator plate 2b in a plane parallel to the plate planes of the separator plates 2a-e in the positive and the negative x-direction 6. To achieve a positive locking connection between the individual plates 2a" and 2b' in the x-y plane, a similarly designed pair of fixing elements 13a", 13b' may suffice, said pair is designed on one of the outer edges of the separator plates arranged at right angles to the outer edges of the separator plates under consideration. In this way, the fixing elements 13a" and 13b' may function as guide structures when stacking the separator plates 2a and 2b and thus facilitate the assembly of the stack 400.

Figure 6A:
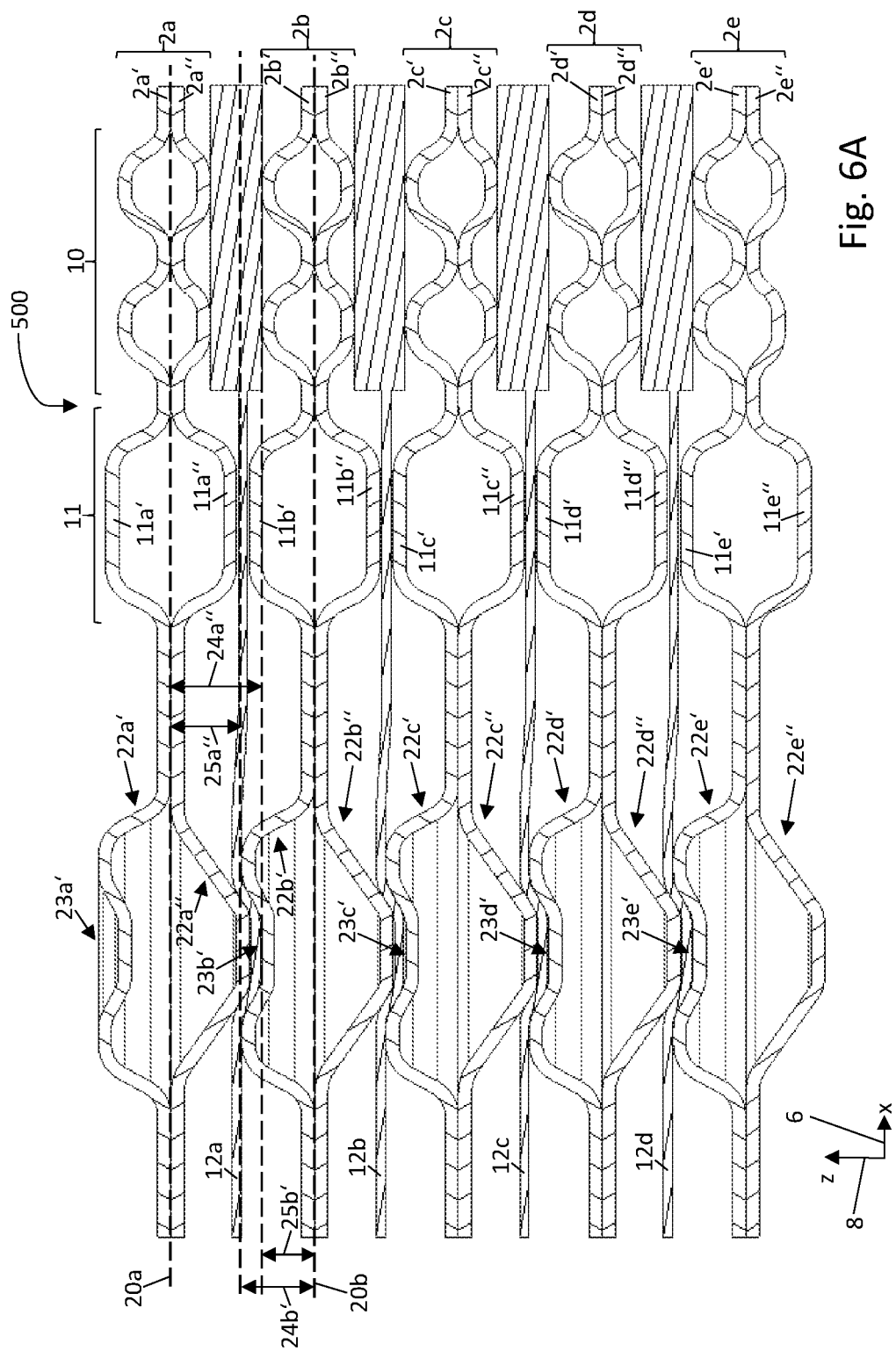
FIG. 6A schematically shows a section from the stack of the system according to FIG. 1 according to a fourth embodiment in a sectional view.
Figure 6B:
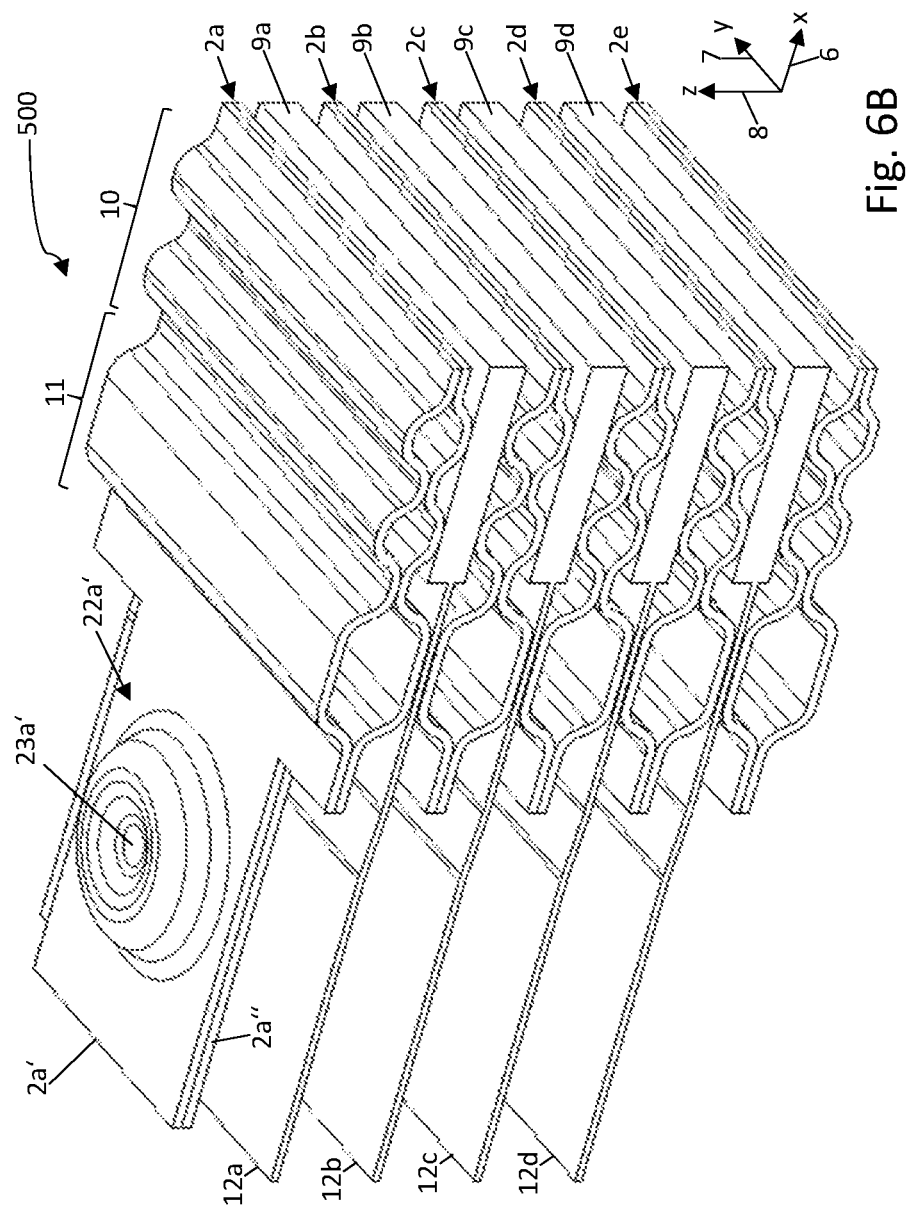
FIG. 6B schematically shows a perspective view of the section from FIG. 6A.
Figure 6C:
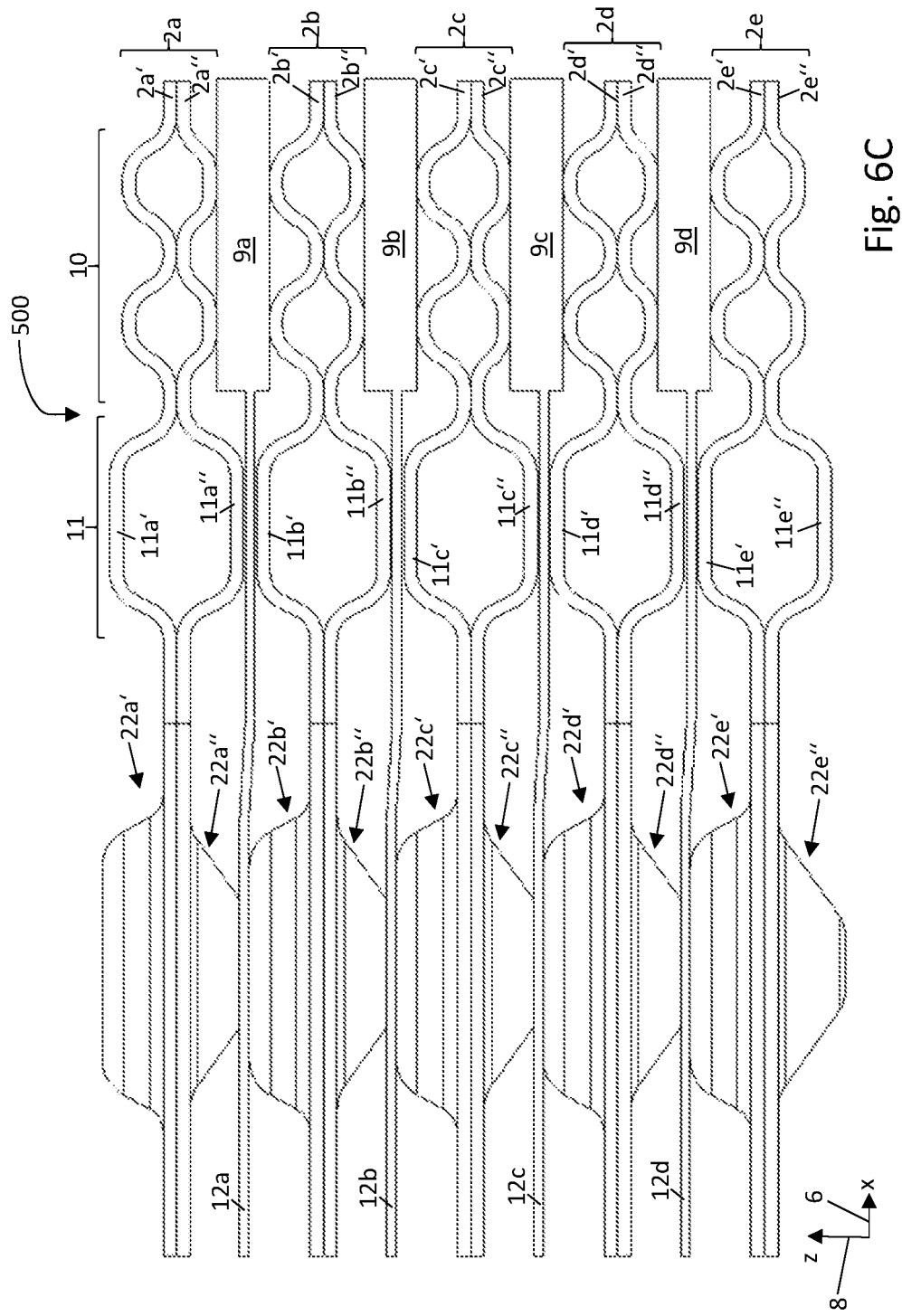
FIG. 6C schematically shows another sectional view of the section from FIG. 6A.
Figure 6D:
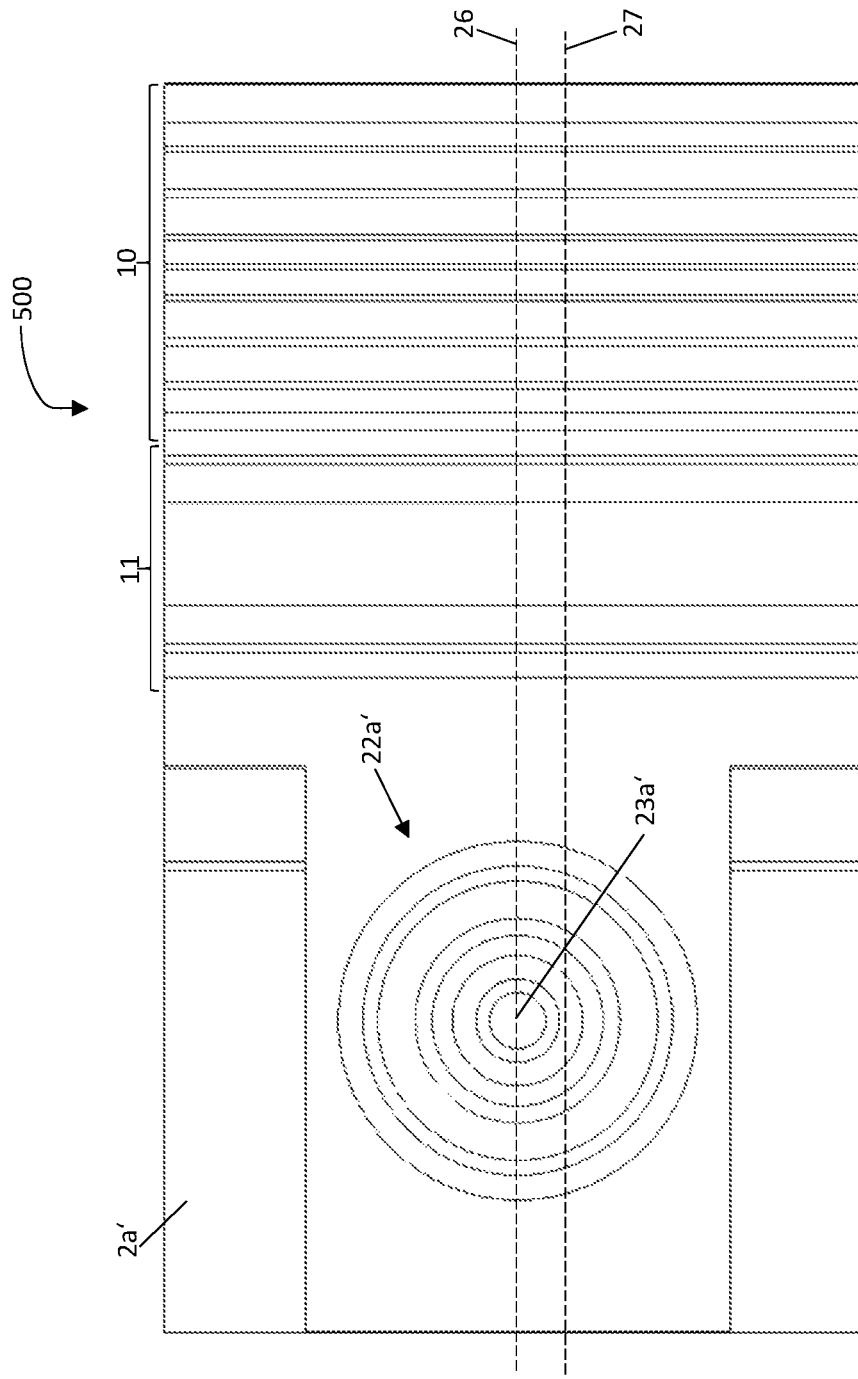
FIG. 6D schematically shows the section from FIG. 6A in a top view.

FIGS. 6A-D schematically show a section of a stack 500 of the electrochemical system 1 shown in FIG. 1 according to a fifth embodiment. FIG. 6A shows a sectional view of this section, wherein section plane 26 is aligned parallel to the x-z plane (see FIG. 6D). FIG. 6B shows a perspective view of the section depicted in FIG. 6A. FIG. 6C shows another sectional view of this section, wherein section plane 27 according to FIG. 6C is aligned parallel to the section plane according to FIG. 6A (see FIG. 6D). And FIG. 6D shows a top view of the section depicted in FIGS. 6A-C, wherein the line of sight is aligned along the stacking direction 8. Furthermore, section planes 26, 27 of FIGS. 6A, 6C are highlighted by dashed lines in FIG. 6D.

The elevated areas forming the fixing elements of separator plates adjacent to one another are each arranged in such a way and are designed to be complementary to one another in such a way that they each engage in a positive locking way in one another, at least in a plane parallel to the plate planes of the separator plates 2a-e, namely as in some of the previously shown embodiments, while accommodating at least one section of one of the frames 12a-d between the elevated areas of adjacent separator plates. Furthermore, the elevated areas 22a', 22a", 22b', 22b", 22c', 22c", 22d', 22d", 22e', 22e" are each arranged outside of the active area 10.

The individual plates 2a", 2b", 2c", 2d", 2e" of the separator plates 2a-e of the stack 500 each have one first elevated areas 22a", 22b", 22c", 22d", 22e" molded into the respective individual plate and designed to be integral with the respective individual plate. First elevated areas 22a'', 22b'', 22c'', 22d'', 22e'' each project in the negative z-direction 8 beyond sealing beads 11a'', 11b'', 11c'', 11d'', 11e'' of the individual plates 2a'', 2b'', 2c'', 2d'', 2e''. For example, a certain height 24a'' of the first elevated area 22a'' of the individual plate 2a'', arising from the plate plane 20a of the separator plate 2a and along the stacking direction 8, is greater than a certain height 25a'' of the sealing bead 11a'' of the same individual plate 2a'', arising from the same plate plane 20a and along the stacking direction 8.

The individual plates 2a', 2b', 2c', 2d', 2e' of the separator plates 2a-e of the stack 500 each have a second elevated area 22a', 22b', 22c', 22d', 22e' molded into the respective individual plate and designed to be integral with the respective individual plate. The second elevated areas 22a', 22b', 22c', 22d', 22e' each project in the positive z-direction 8, wherein they are formed to the same extent from the individual plate 2a', 2b', 2c', 2d', 2e' as the sealing beads 11a', 11b', 11c', 11d', 11e'. For example, a certain height 24b' of the second elevated area 22b' of the individual plate 2b', arising from the plate plane 20b of the separator plate 2b and along the stacking direction 8, is substantially equal to a certain height 25b' of the sealing bead 11b' of the same individual plate 2b', arising from the same plate plane 20b and along the stacking direction 8.

The second elevated areas 22a', 22b', 22c', 22d', 22e' of the individual plates 2a', 2b', 2c', 2d', 2e' facing in the positive z-direction 8 each have a depression 23a', 23b', 23c', 23d', 23e'. The first elevated areas 22a'', 22b'', 22c'', 22d'', 22e'' of the individual plates 2a'', 2b'', 2c'', 2d'', 2e'' facing in the negative z-direction 8 each have a complementary shape to the depressions 23a', 23b', 23c', 23d', 23e' of the second elevated areas 22a', 22b', 22c', 22d', 22e' and are each accommodated in the depressions 23a', 23b', 23c', 23d', 23e' of the second elevated areas 22a', 22b', 22c', 22d', 22e' while accommodating at least one section of one of the frames 12a-d.

In the stack 500, the first elevated areas 22a'', 22b'', 22c'', 22d'', 22e'' and the second elevated areas 22a', 22b', 22c', 22d', 22e' are each formed in such a way to be complementary to one other and are arranged in such a way that each pair of first and second elevated areas in the individual plates facing one another of adjacent separator plates 2a-e effect a positive locking connection in two directions parallel to the plate planes of the separator plates 2a-e.

E.g., the depressions 23a', 23b', 23c', 23d', 23e' of the second elevated areas 22a', 22b', 22c', 22d', 22e' each have a round cross section parallel to the plate planes of the separator plates 2a-e, which cross section expands conically at least in sections in the positive z-direction 8. In FIG. 6B, the second area 22a' of the individual plate 2a' of the separator plate 2a is depicted with the depression 23a', wherein the depression 23a' expands conically at least in sections in the positive z-direction 8. The first elevated areas 22a'', 22b'', 22c'', 22d'', 22e'' each have a round cross section parallel to the plate planes of the separator plates 2a-e, e.g., complementary to the depressions 23a', 23b', 23c', 23d', 23e' of the second elevated areas 22a', 22b', 22c', 22d', 22e', which cross section conically tapers, at least in sections, in the negative z-direction 8. However, it is also conceivable that the depressions 23a', 23b', 23c', 23d', 23e' of the second elevated areas 22a', 22b', 22c', 22d', 22e' and the first elevated areas 22a'', 22b'', 22c'', 22d'', 22e'' accommodated in these depressions have other cross sections that are complementary to one another.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious. It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, are also regarded as included within the subject matter of the present disclosure.

The invention claimed is:

1. An electrochemical system comprising:
   a first metallic separator plate and a second metallic separator plate which each define a plate plane and are stacked in a stacking direction perpendicular to the plate planes;
   a membrane assembly arranged between the separator plates, the membrane assembly comprising an electrolytic membrane or a water exchange membrane, to form an electrochemical cell between the separator plates;
   at least one sealing element for sealing the electrochemical cell comprising a first sealing element extending from the first separator plate and a second sealing element extending from the second separator plate, the separator plates stacked such that the first and second sealing elements are in contact with one another; and
   fixing elements fixing movement of the separator plates relative to one another, the movement parallel to the plate planes of the separator plates; the fixing elements comprising:
      at least one first fixing element formed with uniformity of material and integrally with the first separator plate, the at least one first fixing element is different from the at least one sealing element, is spaced apart from the at least one sealing element in a plane parallel to the plate planes of the separator plates, extends from the plate plane of the first separator plate, and projects at least in sections beyond the plate plane of the first separator plate in the stacking direction;
      at least one second fixing element formed with uniformity of material and integrally with the second separator plate, the at least one second fixing element is different from the at least one sealing element, is spaced apart from the at least one sealing element in a plane parallel to the plate planes of the separator plates, extends from the plate plane of the second separator plate, and projects in the stacking direction across a gap formed by the at least one sealing element to contact an exterior side of the membrane assembly at the plate plane of the first separator plate and an interior side of the membrane assembly contacting an exterior side of the first fixing element at the plate plane of the first separator plate; and wherein the first fixing element is supported on the second fixing element in such a way that the second fixing element prevents a displacement of the first separator plate relative to the second separator plate in at least one of two opposite directions along an axis or straight line aligned parallel to the plate planes.

2. The electrochemical system according to claim 1, wherein each metallic separator plate comprising a sealing element height in the stacking direction such that plate planes in a stack are separated from another plate plane by a distance of two of the sealing element heights, and wherein the first fixing element and the second fixing element project in the stacking direction to at least the distance of two of the sealing bead heights.

3. The electrochemical system according to claim 1, wherein a frame of the membrane assembly is accommodated between the first fixing element and the second fixing element.

4. The electrochemical system according to claim 3, wherein said frame section is accommodated and arranged between the first fixing element and the second fixing element in such a way that it electrically insulates the first fixing element and the second fixing element from one another.

5. The electrochemical system according to claim 1, wherein the at least one sealing element is integrally formed into the first separator plate and the second separator plate, the first fixing element is formed integrally with the first separator plate, and the second fixing element is formed integrally with the second separator plate, the fixing elements formed on a side of the at least one sealing element exterior to an active region, and
a base of the at least one first fixing element is coplanar with the plate plane of the first separator plate, and a base of the at least one second fixing element is coplanar with the plate plane of the second separator plate.

6. The electrochemical system according to claim 1, wherein the separator plates are each formed from metal.

7. The electrochemical system according to claim 1, wherein the at least one sealing element comprises at least one first sealing element, which is integral with the first separator plate, and that the at least one sealing element comprises at least one second sealing element, which is integral with the second separator plate.

8. The electrochemical system according to claim 7, wherein the first sealing element comprises a first sealing bead molded into the first separator plate, and that the second sealing element comprises a second sealing bead molded into the second separator plate, wherein the first sealing bead and the second sealing bead mutually support one another and accommodate the membrane assembly between the first sealing bead and the second sealing bead.

9. The electrochemical system according to claim 1, wherein the separator plates each comprise two individual plates, which are materially bonded to one another.

10. The electrochemical system according to claim 9, wherein in each case precisely only one of the individual plates of each of the separator plates has at least one fixing element in the form of at least one extension of this individual plate.

11. The electrochemical system according to claim 9, wherein both of the individual plates of each of the separator plates has at least one fixing element in the form in each case of at least one extension of the respective individual plate.

12. The electrochemical system according to claim 1, wherein the first fixing element comprises an elevated area, molded into the first separator plate and facing the second separator plate, and that the second fixing element comprises a second elevated area molded into the second separator plate and facing the first separator plate, wherein the second elevated area of the second separator plate has a depression which has a complementary shape, at least in areas, to the first elevated area of the first separator plate, and wherein the first elevated area of the first separator plate is accommodated, at least in areas, in the depression of the second elevated area of the second separator plate.

13. An electrochemical system comprising:

a first metallic separator plate and a second metallic separator plate which each define a plate plane and are stacked in a stacking direction perpendicular to the plate planes;

a membrane assembly arranged between the separator plates to form an electrochemical cell between the separator plates, the membrane assembly comprising an electrolytic membrane or a water exchange membrane;

at least one sealing element for sealing the electrochemical cell comprising a first sealing element extending from the first separator plate and a second sealing element extending from the second separator plate, the separator plates stacked such that the first and second sealing elements are in contact with one another; and fixing elements fixing movement of the separator plates relative to one another, the movement parallel to the plate planes of the separator plates; the fixing elements comprising:

at least one first fixing element formed with uniformity of material and integrally with the first separator plate, the at least one first fixing element is different from the at least one sealing element, is spaced apart from the at least one sealing element in a plane parallel to the plate planes of the separator plates, extends from the plate plane of the first separator plate, and projects at least in sections beyond the plate plane of the first separator plate in the stacking direction;

at least one second fixing element formed with uniformity of material and integrally with the second separator plate, the at least one second fixing element is different from the at least one sealing element, is spaced apart from the at least one sealing element in a plane parallel to the plate planes of the separator plates, extends from the plate plane of the second separator plate, and projects in the stacking direction across a gap formed by the at least one sealing element to contact an exterior side of the first fixing element through an electrically insulating coating or an exterior side of the membrane assembly at the plate plane of the first separator plate, and wherein the first fixing element is supported on the second fixing element in such a way that the second fixing element prevents a displacement of the first separator plate relative to the second separator plate in at least one of two opposite directions along an axis or straight line aligned parallel to the plate planes.

14. The electrochemical system according to claim 13, wherein the fixing elements are elastic at least in an angle formed with a respective plate plane, and the angle formed with a respective plate plane changing with corresponding movement of the first separator plate or the second separator plate in the stacking direction.

15. The electrochemical system according to claim 13, wherein the at least one sealing element, the first fixing element, and the second fixing element are molded into the respective separator plates using embossing or deep drawing such that at least one sealing element, the first fixing element, and the second fixing element are monolithic with the respective separator plates.

16. The electrochemical system according to claim 13, wherein the first fixing element forms an extension of the first separator plate at a first angle in the stacking direction, and that the second fixing element forms an extension of the second separator plate at the first angle in the stacking direction, and the first fixing element is nested within the second fixing element.

17. The electrochemical system according to claim 16, wherein the first angle is between 91 degrees and 135 degrees relative to the respective plate plane.

18. The electrochemical system according to claim 16, wherein the fixing elements are arranged at each corner of the respective separator plate and cross sections of the fixing elements are curved.

19. The electrochemical system according to claim 16, wherein the fixing elements comprise a curved section forming the first angle and a straight section extending in the stacking direction, the straight section of the first fixing element nesting within the straight section of the second fixing element.

20. The electrochemical system according to claim 16, wherein the extensions each have a bead-like depression for increasing their stiffness, said depression is aligned along the section of the respective extension angled relative to the plate plane.

* * * * *